(12) United States Patent
Meltzer et al.

(10) Patent No.: US 11,710,373 B2
(45) Date of Patent: Jul. 25, 2023

(54) DISTRIBUTED LEDGER BASED DISTRIBUTED GAMING SYSTEM

(71) Applicant: SpoonRead Inc., Capitola, CA (US)

(72) Inventors: Bart Alan Meltzer, Corralitos, CA (US); Mayank V. Vadodaria, Cupertino, CA (US)

(73) Assignee: SpoonRead Inc., Aptos, CA (US)

( * ) Notice: Subject to any disclaimer, the term of this patent is extended or adjusted under 35 U.S.C. 154(b) by 328 days.

(21) Appl. No.: 17/060,454

(22) Filed: Oct. 1, 2020

(65) Prior Publication Data

US 2021/0233351 A1    Jul. 29, 2021

Related U.S. Application Data

(63) Continuation-in-part of application No. 16/832,759, filed on Mar. 27, 2020, now abandoned.
(Continued)

(51) Int. Cl.
*G07F 17/32* (2006.01)
*G06Q 20/38* (2012.01)

(52) U.S. Cl.
CPC ..... *G07F 17/3241* (2013.01); *G06Q 20/3827* (2013.01); *G07F 17/3223* (2013.01); *G07F 17/3248* (2013.01)

(58) Field of Classification Search
CPC ............ G07F 17/3241; G07F 17/3223; G07F 17/3248; G06Q 20/3827
See application file for complete search history.

(56) References Cited

U.S. PATENT DOCUMENTS 7,158,971 B1    1/2007 Bascom
7,428,706 B2    9/2008 Hagan et al.
(Continued)

FOREIGN PATENT DOCUMENTS

GB    2444338 A    6/2008

OTHER PUBLICATIONS

U.S. Appl. No. 15/798,248, filed Oct. 30, 2017, U.S. Pat. No. 10,796,591, Oct. 6, 2020, Issued.
(Continued)

*Primary Examiner* — Courtney P Jones
(74) *Attorney, Agent, or Firm* — Haynes Beffel & Wolfeld LLP; Ernest J. Beffel, Jr.; Paul A. Durdik

(57) ABSTRACT

The technology teaches a distributed gaming system, comprising a server-side node configured to administer transactions for a gambling casino, selling and redeeming chips using a private database, and recording transactions on a distributed ledger using crypto-tokens for a house account, with a token vault wallet that has a unique identifier and private key to track transactions. Customer wallets, intermediary accounts and one-way redemption wallets track transactions on the distributed ledger. Client-side nodes accept token purchase messages and transfer tokens in the ledger and record in the database, accept token-to-chip messages from an intermediary account and transfer tokens on the ledger to the redemption wallet to extinguish and record the exchange, accept chip-to-token messages from an intermediary account and transfer tokens from the vault to the customer account and record the exchange, and accept token-to-fiat messages from an intermediary account and transfer tokens to extinguish, and record the exchange.

27 Claims, 11 Drawing Sheets

Related U.S. Application Data

(60) Provisional application No. 62/965,153, filed on Jan. 23, 2020.

(56) References Cited

U.S. PATENT DOCUMENTS

| | | | |
|---|---|---|---|
| 7,783,986 | B2 | 8/2010 | Barsness et al. |
| 8,132,242 | B1 | 3/2012 | Wu |
| 8,281,149 | B2 | 10/2012 | Laurie et al. |
| 8,812,364 | B2 | 8/2014 | MacMillan et al. |
| 8,904,181 | B1 | 12/2014 | Felsher et al. |
| 9,153,141 | B1 | 10/2015 | Kane, Jr. et al. |
| 9,282,149 | B2 | 3/2016 | Johnston |
| 9,367,227 | B1 | 6/2016 | Kim |
| 9,413,710 | B1 | 8/2016 | Saylor et al. |
| 9,554,184 | B2 | 1/2017 | Deo et al. |
| 9,592,444 | B2 | 3/2017 | Knutsson et al. |
| 9,665,529 | B1 | 5/2017 | Lattyak et al. |
| 9,678,634 | B2 | 6/2017 | Murray et al. |
| 9,697,497 | B2 | 7/2017 | Kessel et al. |
| 10,297,106 | B1 | 5/2019 | Simons |
| 2003/0210226 | A1 | 11/2003 | Ho et al. |
| 2004/0067794 | A1 | 4/2004 | Coetzee |
| 2004/0234936 | A1 | 11/2004 | Ullman et al. |
| 2005/0287509 | A1 | 12/2005 | Mohler |
| 2006/0031683 | A1 | 2/2006 | Marion et al. |
| 2007/0060310 | A1 | 3/2007 | Juds et al. |
| 2007/0255661 | A1 | 11/2007 | Yoshida et al. |
| 2007/0288513 | A1 | 12/2007 | Jenkins et al. |
| 2008/0222552 | A1 | 9/2008 | Batarseh et al. |
| 2008/0234047 | A1 | 9/2008 | Nguyen |
| 2008/0248875 | A1 | 10/2008 | Beatty |
| 2008/0293030 | A1 | 11/2008 | Hixon et al. |
| 2010/0058054 | A1 | 3/2010 | Irvine |
| 2010/0233667 | A1 | 9/2010 | Wilson et al. |
| 2010/0235924 | A1 | 9/2010 | Bulot et al. |
| 2010/0325441 | A1 | 12/2010 | Laurie et al. |
| 2011/0257961 | A1 | 10/2011 | Tinkler et al. |
| 2012/0023101 | A1 | 1/2012 | Heimendinger et al. |
| 2013/0004935 | A1 | 1/2013 | Smith et al. |
| 2013/0007856 | A1 | 1/2013 | Bennett et al. |
| 2013/0031456 | A1 | 1/2013 | Fu et al. |
| 2013/0073672 | A1 | 3/2013 | Ayed |
| 2013/0117703 | A1 | 5/2013 | Jang et al. |
| 2013/0124953 | A1 | 5/2013 | Fan et al. |
| 2013/0179823 | A1 | 7/2013 | Batarseh et al. |
| 2013/0298208 | A1 | 11/2013 | Ayed |
| 2013/0309648 | A1 | 11/2013 | Park et al. |
| 2014/0108914 | A1 | 4/2014 | Qu |
| 2014/0215341 | A1 | 7/2014 | Fratti et al. |
| 2014/0236772 | A1 | 8/2014 | McCoy et al. |
| 2014/0315163 | A1 | 10/2014 | Ingrassia, Jr. et al. |
| 2014/0380428 | A1 | 12/2014 | Kobayashi |
| 2015/0034716 | A1 | 2/2015 | Rouchouze et al. |
| 2015/0050632 | A1 | 2/2015 | Sran |
| 2015/0072321 | A1 | 3/2015 | Cohen |
| 2015/0187225 | A1 | 7/2015 | Worsley |
| 2015/0199400 | A1 | 7/2015 | Wu |
| 2015/0281225 | A1* | 10/2015 | Schoen .................. H04L 63/06 726/9 |
| 2015/0281229 | A1 | 10/2015 | Kang et al. |
| 2015/0324896 | A1 | 11/2015 | Marson et al. |
| 2015/0346930 | A1 | 12/2015 | Murray et al. |
| 2015/0356257 | A1 | 12/2015 | Wright et al. |
| 2016/0012744 | A1 | 1/2016 | Rogers et al. |
| 2016/0117953 | A1 | 4/2016 | Lluch |
| 2016/0225224 | A1 | 8/2016 | Nguyen et al. |
| 2016/0259936 | A1 | 9/2016 | Mukherjee et al. |
| 2016/0292672 | A1 | 10/2016 | Fay et al. |
| 2017/0134444 | A1 | 5/2017 | Buckley et al. |
| 2017/0294134 | A1 | 10/2017 | Angel et al. |
| 2018/0121911 | A1 | 5/2018 | Hallam et al. |
| 2018/0189921 | A1* | 7/2018 | Feng ..................... G06Q 50/34 |
| 2018/0241751 | A1 | 8/2018 | Kruse |
| 2018/0247302 | A1 | 8/2018 | Armstrong et al. |
| 2018/0268382 | A1* | 9/2018 | Wasserman .......... G06Q 20/223 |
| 2019/0028276 | A1 | 1/2019 | Pierce et al. |
| 2019/0114707 | A1 | 4/2019 | McSheehan et al. |
| 2019/0130701 | A1* | 5/2019 | Simons ............... G07F 17/3251 |
| 2019/0180558 | A1 | 6/2019 | Merati |
| 2019/0221076 | A1 | 7/2019 | Simons |
| 2019/0347725 | A1 | 11/2019 | de Jong |
| 2019/0370457 | A1* | 12/2019 | Shultz ..................... G06F 21/31 |
| 2020/0027315 | A1 | 1/2020 | Cotton |
| 2020/0065847 | A1 | 2/2020 | Harrison et al. |
| 2020/0082733 | A1 | 3/2020 | Meltzer et al. |
| 2020/0097991 | A1 | 3/2020 | Pistilli et al. |
| 2020/0111279 | A1* | 4/2020 | Cleveland .......... G07F 17/3209 |
| 2020/0213292 | A1 | 7/2020 | Cage et al. |
| 2020/0364720 | A1 | 11/2020 | Lally et al. |
| 2021/0110652 | A1* | 4/2021 | Schwartz ............ G07F 17/3223 |
| 2021/0350359 | A1* | 11/2021 | Silverman ............. H04L 9/3236 |

OTHER PUBLICATIONS

U.S. Appl. No. 16/685,685, filed Nov. 15, 2019, U.S. Pat. No. 11,250,717, Feb. 15, 2022, Issued.

U.S. Appl. No. 17/037,523, filed Sep. 29, 2020, U.S. Pat. No. 11,250,718, Feb. 15, 2022, Issued.

U.S. Appl. No. 17/671,505, filed Feb. 14, 2022, 2022-0277660, Sep. 1, 2022, Pending.

U.S. Appl. No. 17/671,509, filed Feb. 14, 2022, 2022-0254266, Aug. 11, 2022, Published.

U.S. Appl. No. 16/832,759, filed Mar. 27, 2020, 2021-0233200, Jul. 29, 2021, Abandoned.

U.S. Appl. No. 17/060,454, filed Mar. 27, 2020, 2021-0233351, Jul. 29, 2021, Published.

PCT/US2021/014579, Jan. 22, 2021, WO-2021150870 A1, Jul. 29, 2021, Expired.

Hearn et al, "Corda: A distributed ledger.", Corda Technical White Paper 2016 (2016), Aug. 20, 2019 (Aug. 20, 2019), retrieved on Mar. 22, 2021 (Mar. 22, 2021) from <https://www.r3.com/wp-content/uploads/2019/08/corda-technical-whitepaper-August-29-2019.pdf>, 48 pages.

PCT/US2021/014579—International Search Report and Written Opinion dated Apr. 6, 2021, 17 pages.

Dai et al., "Toward Blockchain-Based Accounting and Assurance," Journal of Information Systems, vol. 31, No. 3, Jun. 2017, 17 pages.

U.S. Office Action from U.S. Appl. No. 16/832,759 dated Oct. 23, 2020, 31 pages.

U.S. Office Action from U.S. Appl. No. 16/832,759 dated Dec. 22, 2020, 26 pages.

U.S. Office Action from U.S. Appl. No. 16/832,759 dated Jun. 26, 2020, 35 pages.

U.S. Response to Office Action from U.S. Appl. No. 16/832,759 dated Jun. 26, 2020 filed Jul. 30, 2020, 21 pages.

U.S. Response to Office Action from U.S. Appl. No. 16/832,759 dated Oct. 23, 2020 filed Dec. 1, 2020, 19 pages.

U.S. Response to Office Action from U.S. Appl. No. 16/832,759 dated Dec. 22, 2020 filed Feb. 5, 2021, 20 pages.

U.S. Final Office Action from U.S. Appl. No. 16/832,759 dated May 10, 2021, 33 pages.

U.S. Appl. No. 16/685,685—Response to Office Action dated Mar. 13, 2020, filed Jun. 11, 2020, 14 pages.

U.S. Appl. No. 16/685,685—Office Action dated Jul. 21, 2020, 22 pages.

Solapurkar, Prajakta, "Building Secure Healthcare Services Using OAuth 2.0 and JSON Web Token in IOT Cloud Scenario", Published in: 2016, 2nd International Conference on Contemporary Computing and Informatics (IC3I); 6 Pages.

Au, Richard, "Consumer-Centric and Privacy-preserving Identity Management for Distributed e-Health Systems", Proceedings of the 41st Hawaii International Conference on System Sciences—2008, pp. 10.

Weerasinghe, Dasun, et. al., "Patient's privacy protection with anonymous access to medical services", Mobile Networks Research Group (School of Engineering and Mathematical Sciences), 2008, 4 Pages.

(56) References Cited

OTHER PUBLICATIONS

U.S. Appl. No. 16/832,759—Office Action dated Oct. 23, 2020, 31 pages.
U.S. Appl. No. 16/685,685—Office Action dated Jan. 4, 2021, 27 pages.
Yang, et al., "A New Approach for Anonymous Password Authentication", 2009, 10 pages.
Anwar et al, "Facilitating Trust in Privacy-Preserving E-Learning Environments", IEEE Transactions on Learning Technologies, V.5, No. 1, pp. 62-73, Jan.-Mar. 2012.
Aimeur et al, "Anonymous Credentials for Privacy Preserving E-learning", IEEE_2008 International MCETECH Conference on e-Technologies, pp. 70-80, 2008.
U.S. Appl. No. 16/685,685—Response to Final Office Action dated Jun. 4, 2021 w/AFCP as filed Aug. 11, 2021, 19 pages.
U.S. Appl. No. 16/685,685—Final Office Action dated Jun. 4, 2021, 22 pages.
U.S. Appl. No. 16/685,685—Advisory Action dated Sep. 8, 2021, 11 pages.
U.S. Appl. No. 16/685,685—Request for Continued Examination w/Supplemental Response to Final Office Action dated Jun. 4, 2021 filed Sep. 3, 2021, 34 pages.
U.S. Appl. No. 16/685,685—Response to Final Office Action dated Jul. 21, 2020 filed Oct. 19, 2020, 19 pages.
U.S. Appl. No. 16/685,685—Final Office Action dated Jul. 21, 2020, 22 pages.
U.S. Appl. No. 16/685,685—Response to Non-Final Office Action dated Mar. 13, 2020 filed Jun. 11, 2020, 25 pages.
U.S. Appl. No. 17/037,523—Notice of Allowance dated Oct. 6, 2021 with Supplemental Notice of Allowability dated Nov. 19, 2021, 46 pages.
U.S. Appl. No. 16/685,685—Notice of Allowance dated Oct. 5, 2021, 35 pages.
U.S. Appl. No. 16/685,685—Response to Office Action dated Jan. 4, 2021 filed Mar. 31, 2021, 24 pages.

\* cited by examiner

```
CREATE TABLE tbl_user (
  user_id
  contact_info_id ─────── 702
  ref_user_type_id
  merchant_id
  first_name
  middle_name
  last_name
  date_of_birth
  is_active
  created_date
  modified_date
  modified_by
  is_terms_condtions_accepted
  ...
);
```

Fig. 6A

```
CREATE TABLE tbl_contact_info (
  contact_info_id ─────── 706
  address_1
  address_2
  city
  ref_state_id
  province
  zip
  ref_country_id
  email
  primary_phone
  website_url
  created_date
  modified_date
  modified_by
  ...
);
```

Fig. 6B

```
CREATE TABLE tbl_ethereum_wallet (
  ethereum_wallet_id
  user_id
  merchant_id ─────── 752
      public_address
  private_key
      is_transfer_allowed
      is_buy_enabled
      token_balance
      created_date
  modified_date
  modified_by
      CONSTRAINT
UK_tbl_ethereum_wallet_public_address
UNIQUE
      ( public_address )
  ...
);
```

Fig. 6C

```
CREATE TABLE tbl_merchant_program (
  merchant_program_id ─────── 776
  program_name
  program_description
  merchant_id
  is_active
  created_date
  modified_date
  modified_by
  ...
);
```

Fig. 6D

DISTRIBUTED LEDGER BASED DISTRIBUTED GAMING SYSTEM

PRIORITY APPLICATION

This application is a continuation-in-part of U.S. patent application Ser. No. 16/832,759 filed 27 Mar. 2020, which claims the benefit of U.S. Provisional Patent Application No. 62/965,153 filed 23 Jan. 2020; which applications are incorporated herein by reference.

BACKGROUND

Technological Field

The present invention generally relates to the field of gaming casinos and in particular to a framework of tools improving technology used for interactions between gaming customers and the gaming casino house.

Description of Related Art

Casinos are an area of business with a focus on luxury and pampering of guests and customers as they come and go. With this focus on customer experience, it makes sense to give those visiting the casino what they need right at their fingertips with concierge apps that act as a virtual best friend for customers staying and playing at a casino.

A blockchain network is a decentralized and distributed system that hosts electronic ledgers that can record transactions efficiently and in a verifiable and permanent way. The electronic ledgers comprise blocks of transactions and other information pertinent to the blocks. Transactions can encode for example, transfers of control of tokens between participants in the blockchain network. Each block contains a cryptographic hash of the previous block, thereby creating a chain of blocks or a "blockchain." Blockchain is an append-only linear transactional database. Examples of popular blockchain platforms include Ethereum™, Eris™, Multichain™, Bitcoin™, Hyperledger Fabric™, Credo Blockchain™, and Hyperledger Corda™.

It is desirable to provide improvements in technology that can manage transactions between a customer and a gaming house without using cash, while safely providing for redemption of non-cash tokens into fiat, and establishing immutable records of non-cash transactions available to provide transparency and trust in the network.

SUMMARY

A technology is described herein that includes a method of administering transactions for a gambling casino in a distributed gaming system, including selling chips and redeeming chips using a private database, comprising recording at least some of the transactions on a distributed ledger using crypto-tokens, including one or more administrator wallets, each having a unique house identifier and private key to track transactions on the distributed ledger that include the unique house identifier. The method also includes maintaining user accounts for customers including customer wallets having unique customer identifiers and private keys to track transactions on the distributed ledger that include the unique customer identifiers and maintaining dealer accounts for dealers. The method further includes executing an application program interface (API) with client-side nodes, the API having procedures for accepting token purchase messages indicating confirmation of fiat attributed to the user account for a particular customer and in response transferring tokens from an administrator wallet to a customer wallet. The method additionally includes accepting chip purchase messages indicating confirmation of delivery of chips from a dealer account to an identified user account, and in response transferring tokens from the customer wallet of the identified user account to one of the one or more administrator wallets and recording the purchase of chips in the private database. The method also includes accepting redemption messages indicating confirmation of delivery of chips attributed to the user account for a particular customer to a dealer account, and in response transferring tokens from the customer wallet of the identified user account to one of the one or more administrator wallets and recording the redemption of chips in the private database.

The technology described herein includes a method of administering transactions for a gambling casino in a distributed gaming system, including selling chips and redeeming chips using a private database and a distributed ledger, comprising maintaining a token vault wallet having a unique house identifier and private key to track transactions on the distributed ledger that include the unique house identifier. The method also includes maintaining user accounts for customers including customer wallets having unique customer identifiers and private keys to track transactions on the distributed ledger that include the unique customer identifiers and maintaining intermediary accounts including unique intermediary identifiers and private keys to track transactions on the distributed ledger that include the unique intermediary identifiers. The method further includes maintaining a one-way redemption wallet having a unique redemption identifier and private key to track transactions on the distributed ledger that include the unique redemption identifier. The method additionally includes communicating with client-side nodes in a communication network to execute procedures. One procedure accepts token purchase messages from an identified customer account indicating confirmation of fiat payment by the identified customer account for tokens, and in response transfers tokens in the distributed ledger from the token vault to the unique customer identifier of the identified customer account, and records the token purchase in the private database. Another procedure accepts token-to-chip exchange messages from an identified intermediary account indicating confirmation of exchange tokens for chips, and in response transfers tokens on the distributed ledger to the redemption wallet to extinguish the tokens, and records the token-to-chip exchange in the private database. A further procedure accepts chip-to-token exchange messages from an identified intermediary account indicating confirmation of delivery of chips from a customer having an identified customer account to an intermediary having the identified intermediary account, and in response transfers tokens in the distributed ledger from the token vault to the unique customer identifier of the identified customer account, and records the chip-to-token exchange in the private database. Yet another procedure accepts token-to-fiat exchange messages from an identified intermediary account indicating confirmation of delivery of fiat currency to a customer having an identified user account, and in response transfers tokens from the customer wallet of the identified user account to the redemption wallet to extinguish, and records the token-to-fiat exchange in the private database and on the distributed ledger.

The technology disclosed also includes a computer system having one or more network nodes, configured to execute a set of procedures for establishing and maintaining accounts and for executing the methods described herein.

The technology disclosed also includes a computer program product storing a computer program on non-transitory memory, which when executed at one or more network nodes, executes a set of procedures for establishing and maintaining accounts and other methods described herein.

Other aspects and advantages of the present technology can be seen on review of the drawings, the detailed description and the claims, which follow.

BRIEF DESCRIPTION OF THE DRAWINGS

FIG. 6A through FIG. 6D illustrate the field entries for a representative subset of data structures that are utilized relative to customer apps and wallets, and pit boss apps and wallets, related as shown in FIG. 5.

FIG. 6A shows a representative set of fields for user table with primary key which links the user to the record with contact information.

FIG. 6B illustrates a representative organization of data fields for additional information about the user.

FIG. 6C illustrates a representative organization for an Ethereum wallet data structure.

FIG. 6D illustrates a representative organization for a merchant data structure.

DETAILED DESCRIPTION

A detailed description of embodiments of the technology is provided with reference to the FIGS. 1-10.

A flexible technology platform that supports administering transactions for a gambling casino in a distributed gaming system, including selling chips and redeeming chips using a private database is described herein. The platform provides a technology executed efficiently for frequent, embedded, real-time monitoring of the experience of customers of the gaming house and the experience of the gaming house itself.

The cashless casino gaming system described herein provides a computer implemented device around gambling, many of the layers of which come together to convert the value of physical chips used at gaming tables to stable digital tokens on blockchain. The digital tokens are backed by fiat currency, also known as legal tender, whose value is backed by the government that issued it.

The system includes or has access to a financial repository, or repositories, for fiat currency, and includes or has access to a house blockchain account. The system includes procedures to declare a set of tokens and to store the tokens in trust assurance network. The system includes procedures to distribute stored cryptocurrency tokens tied to the fiat currency in the repository or repositories, and to exchange tokens in the house account for the fiat currency in the financial repository. Tokens in user accounts and in the house account, and tokens exchanged for the chips in circulation, are immutably recorded in the blockchain. The value of the tokens and chips are backed by a promise to exchange them for fiat currency, supported by the immutable records.

Tokens can be transferred among users of blockchain using applications referred to as wallets or digital wallets. A wallet maintains in a secure memory unique identifiers for the holder of the wallet, and provides an interface useable by the holder to support monitoring of the blockchain to identify blockchain transactions to receive tokens and to support creation of blockchain transactions to transfer tokens linked to the unique identifier or unique identifiers of the holder to other participants in the blockchain.

Figure 1:
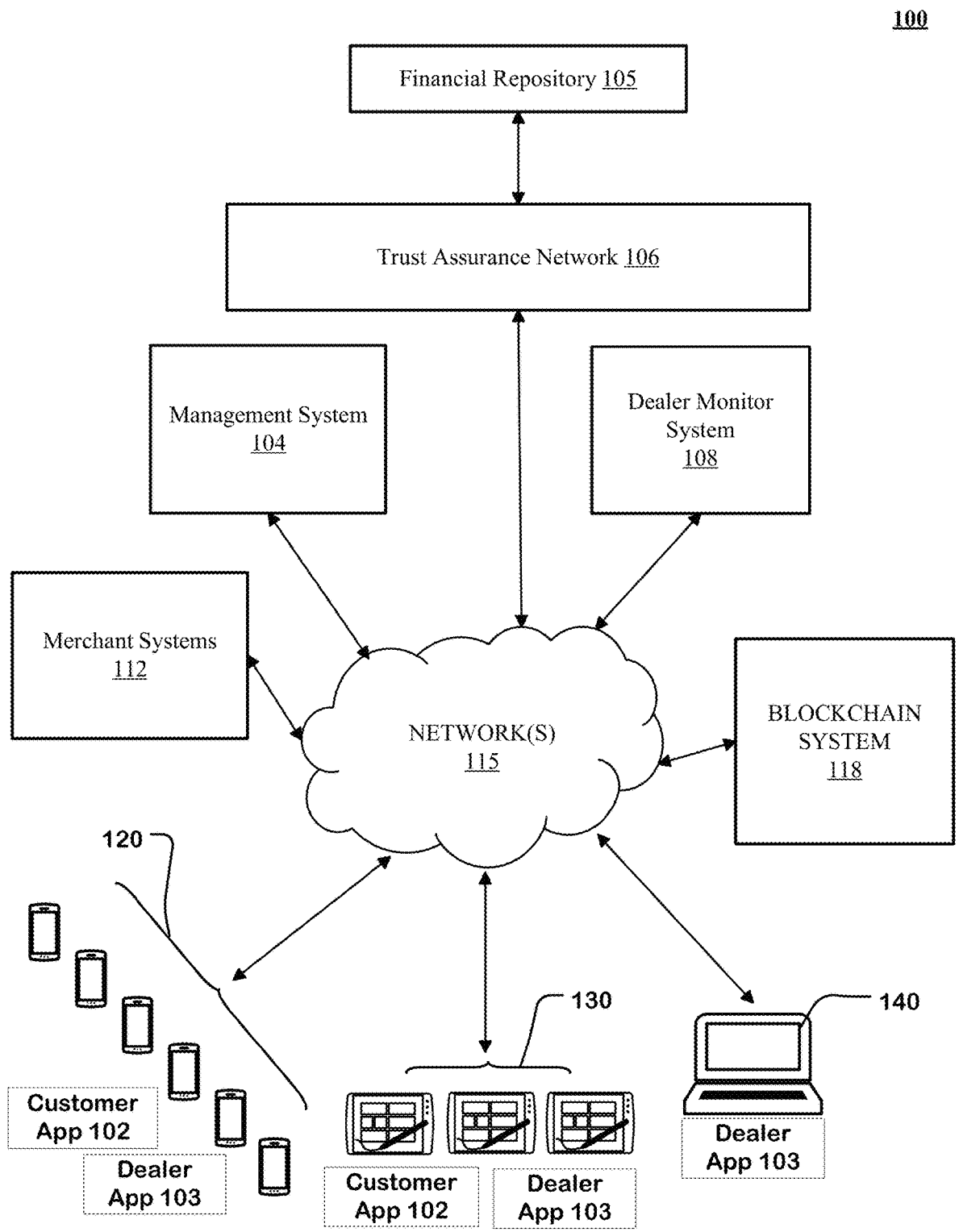
FIG. 1 is a network perspective of a distributed gaming system for administering transactions for a gambling casino including selling chips and redeeming chips using a private database, as described herein.

FIG. 1 is a network perspective of a distributed gaming system 100 for administering transactions for a gambling casino including selling chips and redeeming chips using a private database, as described herein. The network as described includes trust assurance network 106 and technical systems coupled via a network 115 such as the Internet. A plurality of network nodes are configured to execute customer app 102, dealer (or other intermediary) app 103, dealer monitor system 108 and management system 104 for back of house operations. A blockchain system 118 is utilized for transactions on a distributed ledger for transfer of tokens among wallets associated with customer apps, dealer apps, the management system and merchant systems 112. Blockchain transactions can be used to record exchanges of tokens for gambling chips, and to record exchanges of gambling chips for tokens. Also, blockchain transactions can be used to record a purchase from a merchant system, transfer of tokens in exchange for fiat currency, and for transfer of tokens to customers who purchased them. Tokens exchanged for chips or for cash can be extinguished (burned) in the blockchain. The distributed ledger is a consensus of replicated, shared, and synchronized digital data geographically spread across multiple sites, with no central administrator or centralized data storage. Physical chips can become property of customers, who may keep the chips, gamble with the chips, give chips to dealers as tips, or otherwise dispose of the chips.

As used herein, a network node is an addressable application running on a hardware device or virtual device that is attached to a network, and is capable of sending, receiving, or forwarding information over a communications channel to or from other network nodes. Examples of electronic devices which can be deployed as hardware network nodes include all varieties of computers, workstations, laptop computers, handheld computers, and smartphones. Network nodes can be implemented in a cloud-based server system. More than one virtual device configured as a network node can be implemented using a single physical device.

Trust assurance network 106 serves as a banking network buffer and can have an interface for transactions in banking networks, also referred to as financial repository 105. Electronic tokens are fiat backed for participants in the trust assurance network 106 who agree to rely on the banking network buffer to isolate the transactions in the trust assurance network from the banking network, and to rely on agreements to exchange tokens in the trust assurance network for cash in the banking network. The blockchain system 118 provides immutability and transparency for the participants and works to establish trust. Trust assurance network 106 maintains and tracks a strict balance of cash in one or more financial repositories, with issued tokens in circulation on the blockchain and chips in circulation among customers (and others). Security is insured via the immutability of transactions on the distributed ledger in addition to the use of a private database for tracking transactions. The server-side node or nodes in the distributed gaming system are configured to maintain a token vault wallet having a unique house identifier and private key to track transactions on the distributed ledger that include the unique house identifier. The data processors of the server-side node or nodes include logic for authentication and authorization of intermediary account holders and customer account holders at client-side nodes. This logic includes a first protocol for customer account holders on client-side nodes on the communication network, and a second protocol for intermediary account holders on client-side nodes on the communication network. The second protocol for intermediary account holders can include receiving from an authorized supervisor application a request to enable a dealer application, generating a verification code for the request, providing the verification code to the supervisor application in response to the request from the supervisor application to enable a particular intermediary account holder, the verification code being provided to a dealer outside the communication network, and receiving a login request via the communication network from a dealer application to login the particular intermediary account holder by the dealer application using the verification code. Examples of intermediary account holders are dealers and merchants, who each have a unique private key and identifier for their corresponding intermediary accounts.

The server-side node or nodes are configured to create, or utilize, a tranche of tokens in the token vault wallet. The server-side node or nodes are configured to assign tokens to the token vault wallet in response to a message confirming receipt of value. This value can be cash, surety, or other obligation to honor the fiat value of the tokens. The gambling house sends the fiat currency amount to the designated program bank account and receives a message confirming receipt of value, in one scenario. In a different scenario customer-funded tokens can be minted in the token vault wallet. Assignment of tokens to the token vault wallet can be completed using any of several blockchain platforms, including Ethereum™, Eris™, Multichain™, Bitcoin™ Hyperledger Fabric™, Credo Blockchain™, and Hyperledger Corda™.

In FIG. 1, system 100 comprises customer apps for multiple customers, with a node for each distinct customer. The network nodes executing the customer applications and the dealer applications can comprise smart phones 120, tablets 130, laptop or personal computers 140, and other computer systems coupled to the network 115. The system is configured for processing customer transactions and presentation and tracking of transaction history of customer events. The network nodes executing the customer applications and the dealer applications can include wallets or links to wallets executed in server-side nodes.

Management system 104 is a server-side node configured to administer transactions for the gambling casino, for selling chips and redeeming chips, and includes a house account with at least one administrator wallet to track transactions. Management system 104 includes one or more data processors, having access to a private database and a distributed ledger. Management system 104 maintains user accounts for customers, including customer wallets that accept messages indicating confirmation of transactions on the distributed ledger that include the customer's unique identifier, via customer app 102 API. That is, the customer's wallet tracks blockchain transactions and token balance. The customer wallet is related to a corresponding customer account using the customer's unique identifier. Additionally, customer app 102 API procedures identify and authenticate the user, in some cases storing the customer's unique QR code and providing near field communication for authenticating the user. Customer app 102 API procedures can also enable a user to request transactions with marketplaces, in some cases.

When a customer registers for the first time, a customer identification code is generated and loaded into the customer wallet after registration is complete. The customer authentication code is a QR code, in one case. Additional registration elements may be included. When the customer requests digital tokens, customer app 102 API procedures initiate the purchase of digital tokens via a credit card or a cash transaction with a teller. Tokens are transferred to the customer using the customer's unique customer identifier, also known as their blockchain address, via a blockchain transaction also serving as a recording of the cash transaction. The teller functionality of processing a credit card or cash is automated in one implementation; in another the teller is a human. The result of a successful customer transaction requesting to buy digital tokens is the transfer of fiat currency to the financial institution, and the transfer of electronic tokens to the customer wallet in the trust assurance network 106. Management system 104 is configured to administer the transactions for the casino, including selling chips and redeeming chips using a private database. Management system 104 records the transactions on a distributed ledger using crypto-tokens, including administrator wallets, each of which has a unique house identifier and private key to track transactions on the distributed ledger that include the unique house identifier.

FIG. 1 also includes intermediary account, such as dealer accounts with dealer app 103 interface that supports dealers in a gaming environment. Dealer app 103 receives and displays token to chip transactions from customer app 102 and messages for exchanging physical chips to digital tokens. Both types of transactions are recorded as blockchain transactions, as described herein. Dealer app 103 displays requested customer transactions at a gaming table and provides an interface for dealers to review and approve requested transactions. Dealer monitor system 108 displays token to chip and chip to token transactions for viewing via supervisor app by the supervisor, also referred to as pit boss, of multiple dealers in the pit on the casino floor. Management system 104 records in a private database, and can display all digital token to physical chip transactions and all physical chip to digital token transactions for all customers at the gaming tables and also the transactions conferring rewards on customers and the shopping transactions via digital tokens by customers. Management system 104 also displays rewards made available to users of customer app 102.

Customer app 102 identifies and authenticates the customer as present and ready to interact at the table, via multi-factor authentication (MFA) with some combination of multiple identifiers for the customer, such as near field communication, unique QR code and customer PIN before completing point of sale (PoS) transactions. Dealer app 103 receives a request for an electronic token transfer for physical chips for a customer at a gaming table. A verbal exchange, or an exchange of electronic messages, between the dealer and the pit boss confirms the requested transaction, in some scenarios, and the customer receives physical chips in exchange for the customer electronic tokens and uses the physical chips to complete play at the casino tables. Both physical chips and digital tokens are directly usable for shopping for food and drinks and merchandise and services, in some implementations of the digital wallet. In some cases, customer app 102 also receives loyalty digital tokens, based on rules that identify transaction patterns to be rewarded. When the customer leaves the property or community, they can exchange physical chips for digital tokens, typically with a dealer using dealer app 103 at a gaming table. Customer app 102 completes a blockchain transaction transferring the digital tokens to an administrator wallet, in which the tokens correspond to actual cash units (ACUs) that have a one-to-one value with the fiat currency and can be exchanged for cash or credit card credit. In this scenario, the result of a successful customer transaction is that management system 104 returns to the customer the value of the customer's unused digital tokens via the transfer of ACUs, using fiat currency from the bank or via credit being issued to the customer's credit card in exchange for the digital tokens in the customer's digital wallet.

In an example system, wallets are maintained for the various participants, including the following:
1) Customer Wallet: Stores Tokens that a customer can use to exchange fiat currency for tokens, tokens for chips, chips for tokens, and tokens for fiat currency.
2) Dealer Wallet: Stores Tokens derived from Tips (from Chips). Dealer can exchange chips for tokens, and tokens for fiat currency.
3) Token Vault (Wallet): Source of all tokens which traverse the trust assurance network. All tokens of a given tranche or all tranches generated & stored here when the system is initialized for the casino tokens on the blockchain network.
4) House Redemption Wallet: Tokens are sent here, and extinguished, when the house delivers cash or chips to customers, merchants, or a house account in exchange for tokens.
5) Merchant Wallet: Tokens are sent here from a customer wallet when a Merchant offer is redeemed from the marketplace. Tokens in a merchant wallet can be exchanged for fiat currency.
6) House Wallet: Tokens are sent here from a customer wallet when a custom house offer (for goods or services other than chips) is redeemed from the marketplace. Tokens in a house wallet can be exchanged for fiat currency.

Figure 2:
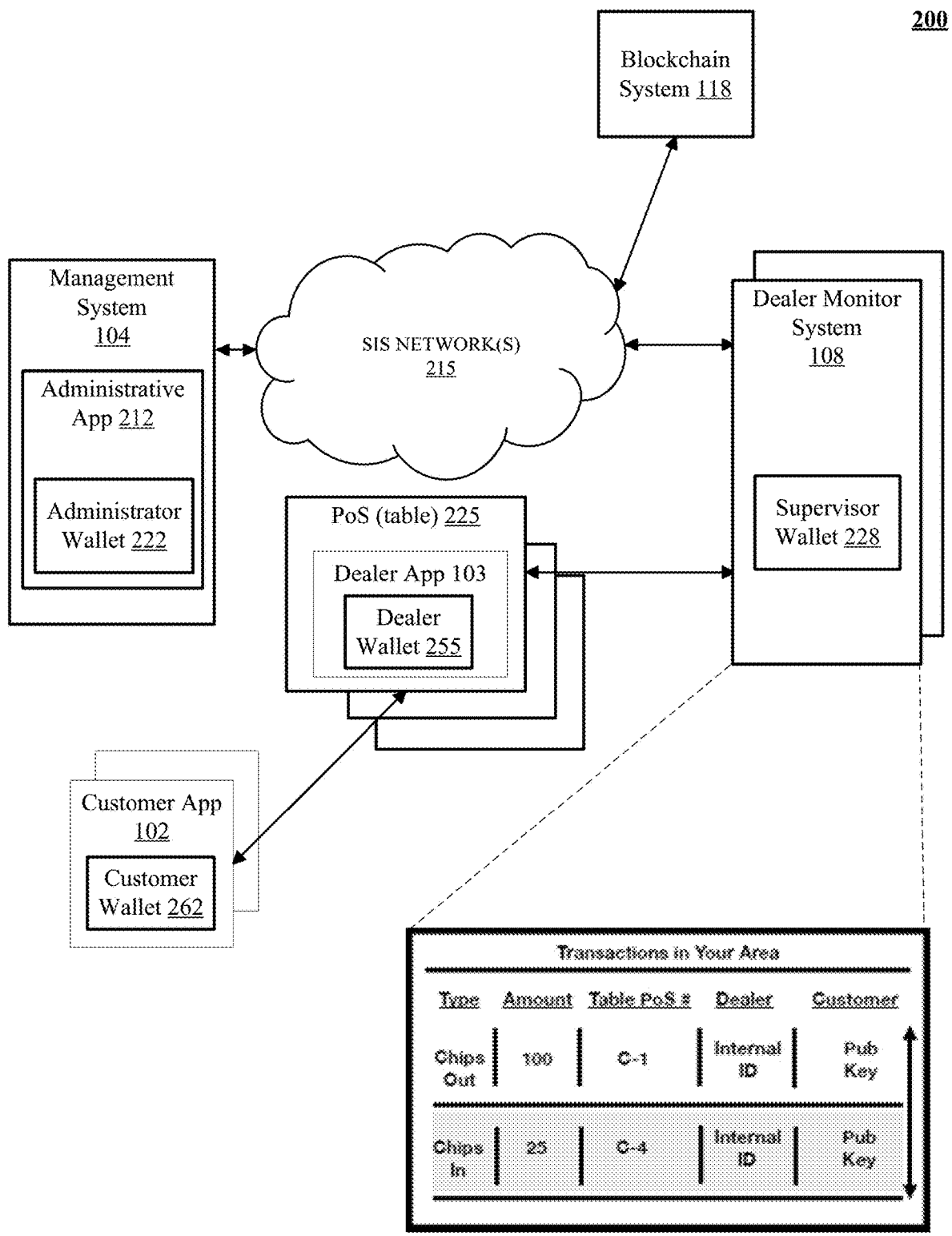
FIG. 2 illustrates system interactions that support the distributed gaming system described herein.

FIG. 2 illustrates system interactions that support the distributed gaming system 200 described herein. The system processes transactions on a distributed ledger, records the transaction history and records the transactions between a customer and a gaming house without using cash. Management system 104, in addition to managing a database system and APIs for interaction within the system 200 that power functionality of the system 200, provides tools for secure registration of supervisors via a sovereign identity system (SIS) 215. Supervisors are also referred to as pit bosses, and multiple pit bosses may be managed by a floor supervisor, in one case. Dealer app 103 at each PoS gaming table 225 is associated with a dealer account including a unique dealer identifier and private key. The dealer account can include a dealer wallet 255 for tracking transactions on the distributed ledger that include the unique dealer identifier. The unique dealer identifier is a blockchain address, in one implementation. Management system 104 includes a protocol for dealer applications on client-side nodes, including a first layer authentication and authorization for a supervisor application on a client-side node, and a second layer for authorization of a dealer application. The second layer delivers a verification code to a supervisor wallet 228 application, after receiving from an authorized supervisor application a request to enable a dealer application. The verification code is deliverable, outside of the network, such as verbally, to a dealer by a user of the supervisor wallet 228 application. The dealer wallet 255 application accepts the verification code input by the dealer as received from the supervisor, and in response the dealer wallet 255 application is authorized to utilize the API. In some implementations, the verification code that authorizes access is valid for only a specific period of time, such as the dealer's shift hours in one example. The supervisor first logs in to the system using supervisor log in credentials and authenticates using a password, fingerprints or other identifier. Once logged in, the supervisor uses the supervisor wallet 228 app to request authorization to enable dealers to access the system. Administrative app 212 provides verification codes to the supervisor wallet 228 app for authorized dealers. Dealer app 103 logs in to the network via the administrative app 212, using the verification code. The supervisor provides the verification codes to the dealers. The verification codes are modified regularly, and can be usable only one time, to enhance security. In one case, a dealer's verification code is updated once for each shift that they work. Dealer app 103 with dealer wallet 255 at point of sale (PoS) table 225 is usable by a dealer to confirm requests for transactions by customers via customer wallet 262 in customer app 102. Supervisor wallet 228 can be utilized to review statistics for a dealer's session and administrative app 212 can deactivate the verification code for a dealer at the end of their shift, or in another example, due to abnormal transactions being reported. Dealers can cash out tips they receive via transactions of tokens from customer wallets and dealer wallets, by utilizing the redemption wallet in some implementations.

Management system 104 manages access by the server-side node to dealer account records by a supervisor application in cooperation with a supervisor account that includes supervisor account records identifying a set of dealer accounts under supervision. This includes receiving from a supervisor application a request to enable a dealer application. The protocol includes generating a verification code for the request, providing the verification code to the supervisor application in response to the request from the supervisor application to enable a particular dealer account. The verification code can be provided to a dealer. The protocol also includes receiving a login request from a dealer application to login the particular dealer account including the verification code, and in response authorizing access to dealer account records for the particular dealer account by the dealer application. These steps securely link the dealer application to the server.

Continuing the description of FIG. 2, a common transaction is to exchange electronic tokens in the customer's digital wallet for a quantity of physical chips. The dealer uses the dealer wallet 255 of dealer app 103 that tracks transactions on the distributed ledger that include the dealer's unique dealer identifier, to review transactions completed on the distributed ledger. Dealer monitor system 108 with supervisor wallet 228 of an authorized supervisor application displays a near real time rolling display of all transactions at the PoS table 225 for every dealer so the pit boss (supervisor) can monitor and review the token to chip transactions and chip to token transactions on the gambling house floor. PoS table 225 also transmits the transactions processed for each gaming table for each dealer for every customer to administrative app 212 to an administrator wallet 222 administered in management system 104, which can be monitored by the back of house floor manager. Each entry in the transaction history includes a time stamp of the time at which the transaction transpired, a table number, the customer's public key identity and the quantity in the transaction, in one implementation. Administrative app 212 displays the transaction history for all of the dealers being managed by a pit boss, and for all of the pit bosses to an identified house manager, in time sequence, in one case.

Using the disclosed distributed ledger transactions for customers, the identity of customers and of dealers and their private identity information (PII) are protected. In one case, table dealers are onboarded by employee number assigned by the company, and that resolves within their HR system. The sovereign identity system (SIS) manages codes for login to PoS and monitoring apps. Hierarchy and login control enable reporting to be accessed by only those who are securely registered.

For the distributed gaming system, a disclosed house account, with a unique house identifier and private key, records transactions on a distributed ledger using crypto-tokens. Administrator wallet 222 tracks transactions on the distributed ledger that include the unique house identifier. The distributed ledger can utilize a blockchain platform such as Ethereum™ Eris™, Multichain™, Bitcoin™, Hyperledger Fabric™, Credo Blockchain™, and Hyperledger Corda™. Customers carry digital currency around in customer wallets, with access via their mobile devices. Fiat to token transactions are recorded at back of house and token to chip and chip to token transactions are viewed by the supervisor in supervisor wallet 228 (pit boss) on the casino floor. Token to chip and chip to token transactions are recorded to administrative app 212 in administrator wallet 222 (back of house) and in a private database. An AI based bot can be utilized to analyze frames of data in the private database, and transactions on the blockchain recorded in wallets, for fraud detection across all transaction points, including the interactions between the PoS at the dealer table and the back of house actions, in one implementation.

Figure 3A:
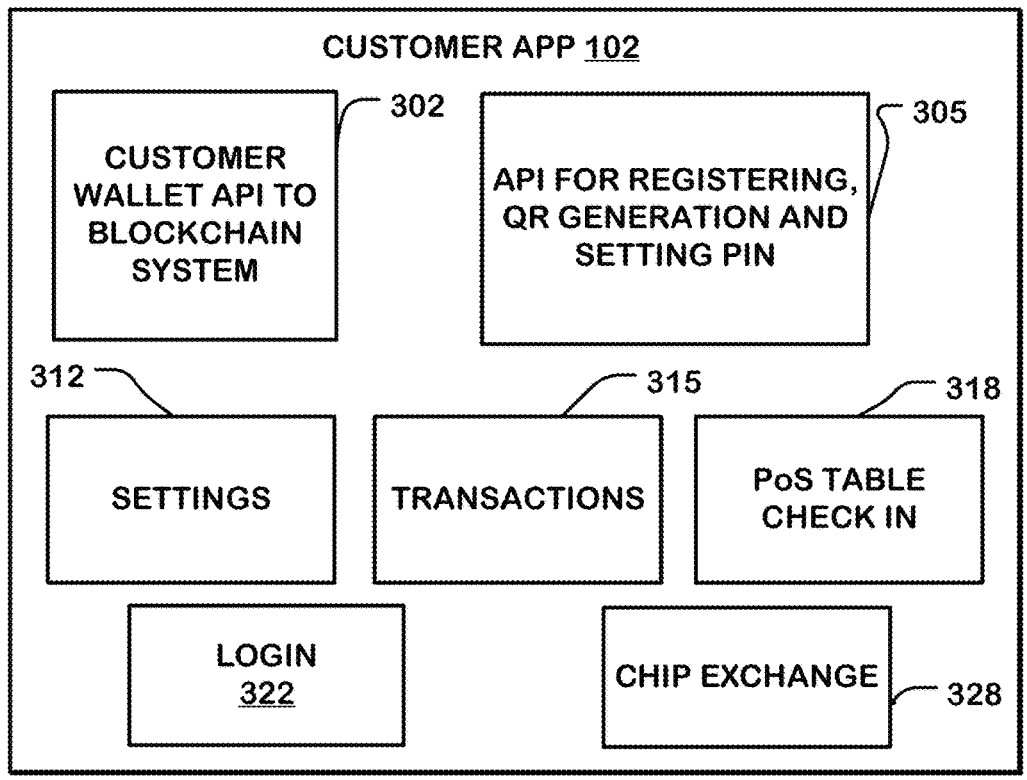
FIG. 3A shows a block diagram for customer app in an embodiment described herein.

FIG. 3A shows a block diagram for customer app 102. Customer wallet API to blockchain system 302 is the interface with the distributed ledger implemented in blockchain system 118. A user account for a customer includes customer wallet 262 tracks transactions on the distributed ledger that include the user's unique customer identifier and private key. API for registering, QR generation and setting PIN 305 provides functions for identifying a customer, confirming a customer's email and connected device, requesting and setting the user's PIN, and generating a unique QR code in some implementations. Settings 312 capture the customer's preferences for their mobile app and device. Transactions 315 includes procedures that record and track purchases, and procedures for storing transactions of fiat currency to token and digital token to fiat currency. Transactions include transfer of tokens from one of the one or more administrator wallets to the customer wallet of the user account for the particular customer, transfer of tokens from the customer wallet of the identified user account to one of the one or more administrator wallets, and transfer of tokens from the customer wallet of the identified user account to one of the one or more administrator wallets. Login 322 confirms the identity of the customer, and authenticates the customer using a password, fingerprints or other identifiers for multi-factor authentication (MFA). Chip exchange 328 authorizes the customer to make transactions at the PoS table 318, after validating the customer's PIN and other authorization criteria such as the customer's unique QR code and optionally near field communication.

Figure 3B:
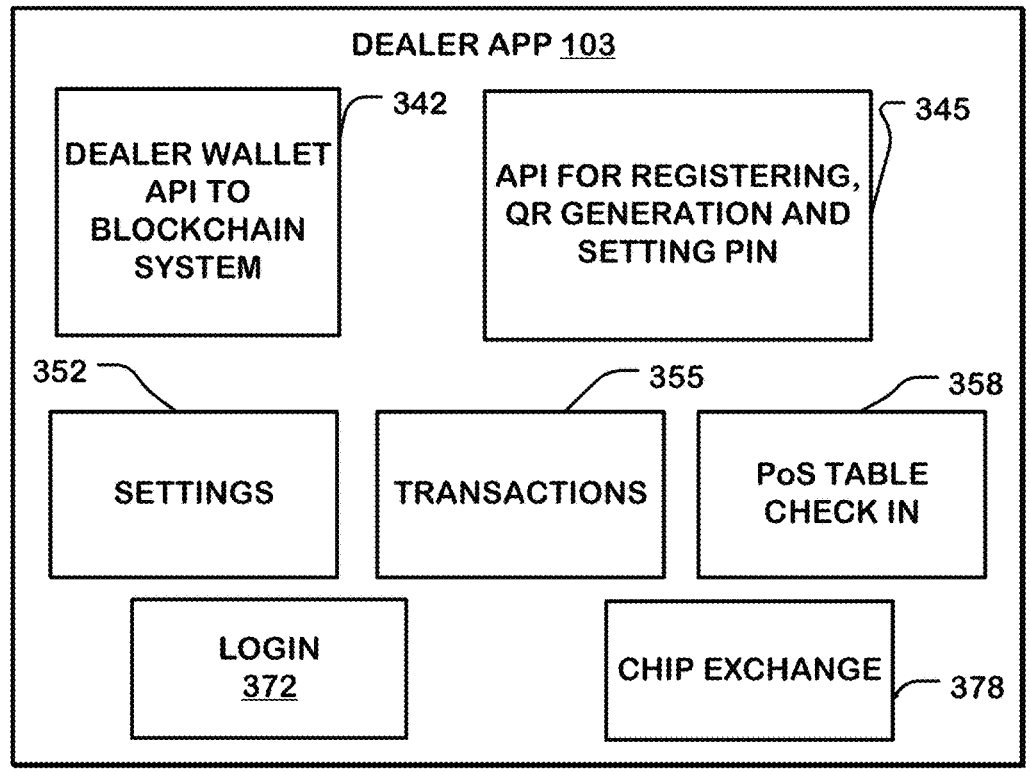
FIG. 3B shows a block diagram for dealer app in an embodiment described herein.

FIG. 3B shows a block diagram for dealer app 103 in an embodiment described herein. Dealer wallet API to blockchain system 342 is a type of intermediary account that interfaces with the distributed ledger implemented in blockchain system 118. Dealer wallet 255 tracks transactions on the distributed ledger that include a unique customer identifier and private key. API for registering, QR generation and setting PIN 345 provides functions for recognizing a customer checking in at a PoS gambling table 358, confirming a customer's connected device, requesting and receiving the user's PIN, and confirming the customer's unique QR code in some implementations. Settings 352 capture the dealer's preferences for their mobile app and device. Transactions 355 procedures record and track chip transactions with customers. Login 372 confirms the identity of the dealer, and authenticates the dealer using a password, fingerprints or other identifiers for multi-factor authentication (MFA). Additionally, login 372 confirms that the verification code entered by the dealer is valid for the dealer for the current time at which the code is entered. Chip exchange 378 authorizes the dealer to make token to chip and chip to token transactions at the PoS table 225, after validating the dealer's verification code. Tokens transferred from a customer wallet 262 to a dealer wallet 255 will be aggregated at the pit-boss level in supervisor wallet 228, in one implementation.

Figure 4:
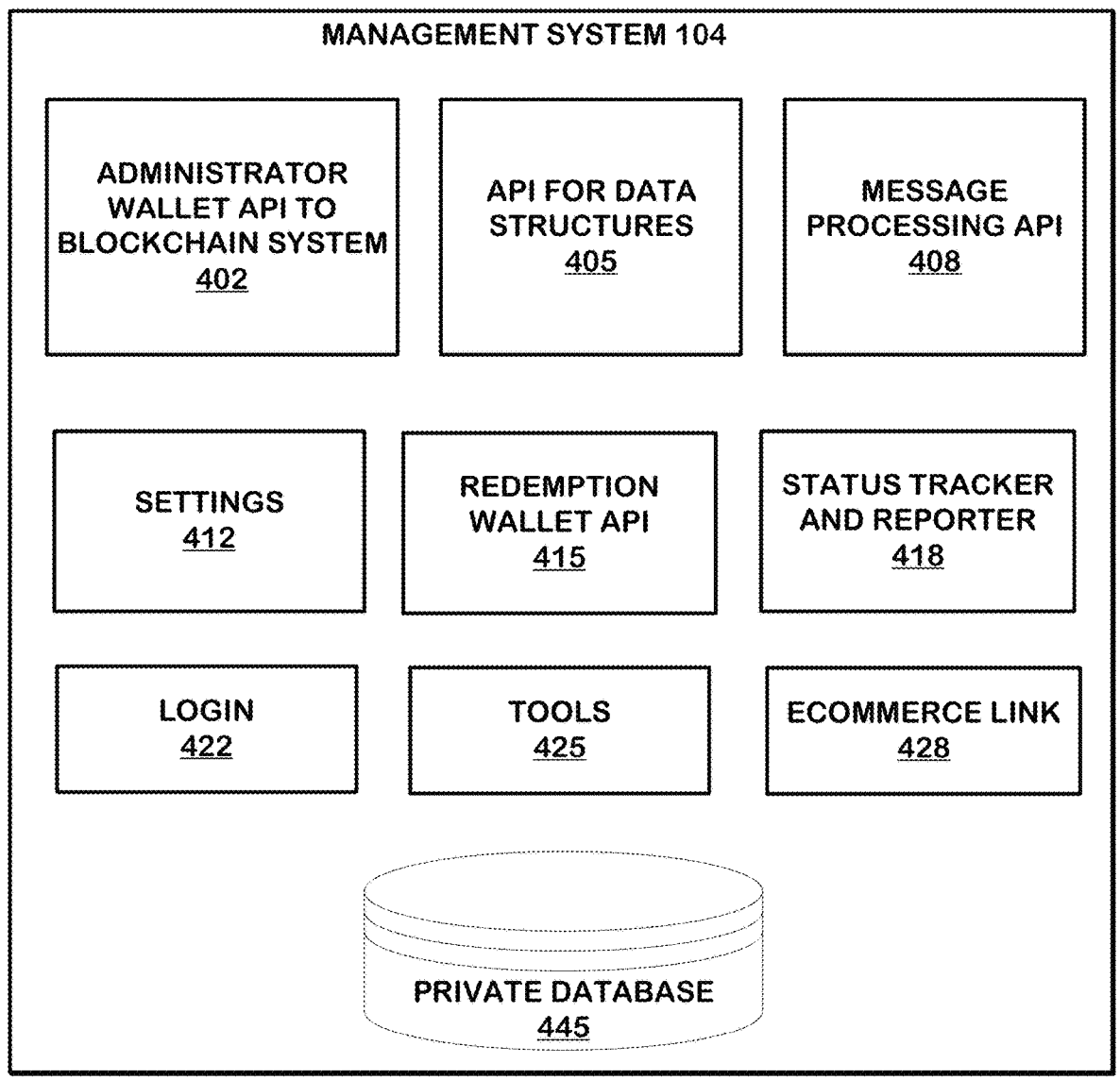
FIG. 4 shows a block diagram for management system configured to administer transactions for the distributed gaming system, in an embodiment described herein.

FIG. 4 shows a block diagram for management system 104 configured to administer transactions for the distributed gaming system with administrative app 212 described herein. Administrative app 212 records at least some of the transactions on a distributed ledger using crypto-tokens for a house account having a unique house identifier and private key, including at least one administrator wallet to track transactions on the distributed ledger that include the unique house identifier. Administrator wallet API to blockchain system 402 is the interface with the distributed ledger implemented in blockchain system 118. Administrator wallet 222 tracks transactions on the distributed ledger that include the unique house identifier and private key. Management system 104 also includes a settings memory 412, storing various settings for the system, operation wallets for processing gas fees for transactions. ERC20 transactions require ETH, also known as gas, to power transactions on the Ethereum blockchain network. Gas fees are processed at ETH system wallets. In one example, gas fee token wallet processes the fees paid in ETH (Ethereum) coin currency to pay for gas. The gas fee can be paid directly by the back of house, in some cases. A fee wallet can collect fees charged for running the distributed gambling system in one implementation. API for data structures 405 is used to access and update data structures that support transactions, in private database 445. Management system 104 also includes private database 445 that stores transaction data in parallel to the blockchain. Private database 445 can be a full customer resource management and accounting database in one implementation.

Management system 104 further includes message processing API 408 that accepts input messages indicating confirmation of payment by a customer and in response transfer tokens from an administrator wallet to a customer wallet. The input messages are API calls that utilize a representational state transfer (REST) API in one implementation. In one case, payment by a customer is via Stripe, a service that allows its users to accept payments online and to keep track of payments and search past payments. In another case, PayPal or Square or other payment processing APIs can be implemented. Message processing API 408 also accepts input messages indicating confirmation of delivery of chips from a dealer to a customer, and in response transfer of tokens from a customer wallet to at least one administrator wallet 222. The dealer app 103 user interface displays a confirmation requirement for the dealer to acknowledge the completion of the transfer of physical chips to a customer in exchange for electronic tokens transferred. Message processing API 408 also accepts input messages indicating confirmation of delivery of chips from a customer to a dealer, and in response transfers tokens from at least one administrator wallet 222 to a customer wallet 262. The dealer app 103 user interface displays a confirmation requirement for the dealer to acknowledge the completion of the transfer of physical chips from a customer in exchange for electronic tokens transferred to the customer. Management system 104 also includes redemption wallet API 415 having a unique redemption identifier and private key to track transactions on the distributed ledger that include the unique redemption identifier. Redemption wallet processes a one directional transaction to extinguish tokens converted to chips, and to extinguish tokens converted to fiat currency. Records in the distributed ledger of extinguished tokens provide a traceable history, for transparency for the customer and for non-repudiation protection for the house, of each step of the history of exchanges.

Management system 104 further includes status tracker and reporter module 418 that records the transactions on a distributed ledger using crypto-tokens for a house account having a unique house identifier and private key, tracking transactions and performance of individual customers and dealers. Status tracker and reporter module 418 maintains user accounts for customers including unique customer identifiers and private keys, utilizing customer wallets 262 that track transactions on the distributed ledger that include a unique customer identifier. The unique customer identifier is the blockchain address for the customer, in one implementation. Status tracker and reporter module 418 also maintains dealer accounts for dealers including unique dealer identifiers and private keys, utilizing dealer wallets 255 that track transactions on the distributed ledger that include a unique dealer identifier, which is the blockchain address for the dealer in one implementation. API for data structures 405 is used to access and update data structures that support the transactions.

Management system 104 also includes tools 425 for display of reports of the status for dealers and customers. Transaction reports can be displayed on a smart phone or tablet in one example, and may be utilized by a floor supervisor, pit boss or dealer to review transactions of customers using the gambling system and to review rewards earned by customers under its supervision according to game rules. Hierarchy and login control enables house reporting to be viewable from multiple perspectives, including data fields of time, supervisor, table, dealer, customer, transaction type, and transaction amount, because the data is included in the distributed ledger entries on the blockchain.

Management system 104 also includes login module 422 which supports identification of a back of house administrator, as well as authentication and authorization procedures necessary for linking to PoS table 225. Management system 104 further includes an ecommerce link 428 linking to resources for the purposes of supporting electronic commerce to obtain rewards in support of the disclosed distributed gaming system.

An example API, including procedures and parameters used for setting up a blockchain ecosystem for blockchain transactions by the customer app and the management system are described next. Master contract interface API procedures set up a smart contract on the blockchain. Ethereum platform is utilized in the example. Ethereum is based on the use of tokens. Tokens represent digital assets, as smart contracts that make use of the Ethereum blockchain. A current instance of the Ethereum master contract pairs with the sub-contract interface declaration API. A different blockchain platform can be utilized for administering transactions for the gambling casino in a distributed gaming system. Owner contract with owner address provides basic authorization control functions, thus simplifying the implementation of user permissions for the contract. The current owner of the blockchain contract can transfer control of the contract to a new owner, in one implementation. When an Ethereum contract is executed, tokens are pre-assigned to the creator, stored in a token vault which can be one of the administrator wallets of the network described herein, in one implementation. An ERC20Basic interface parameters include the total number of tokens in existence and the total number of tokens spent in sale stages. Procedures include transfer of tokens for a specified address and amount to be transferred, as tokens 'to', tokens 'from' and 'to' and procedures to get the balance of the specified address. The distributed gaming system utilizes standard tokens that can be irreversibly burned (destroyed). Procedures include the transfer tokens from one address to another, the ability to check the amount of tokens that an owner allowed to a spender, the ability to increase the amount of tokens that an owner allowed to a spender, and the ability to decrease the amount of tokens that an owner allowed to a spender. The spender is a customer of a casino, in one use case.

Figure 5:
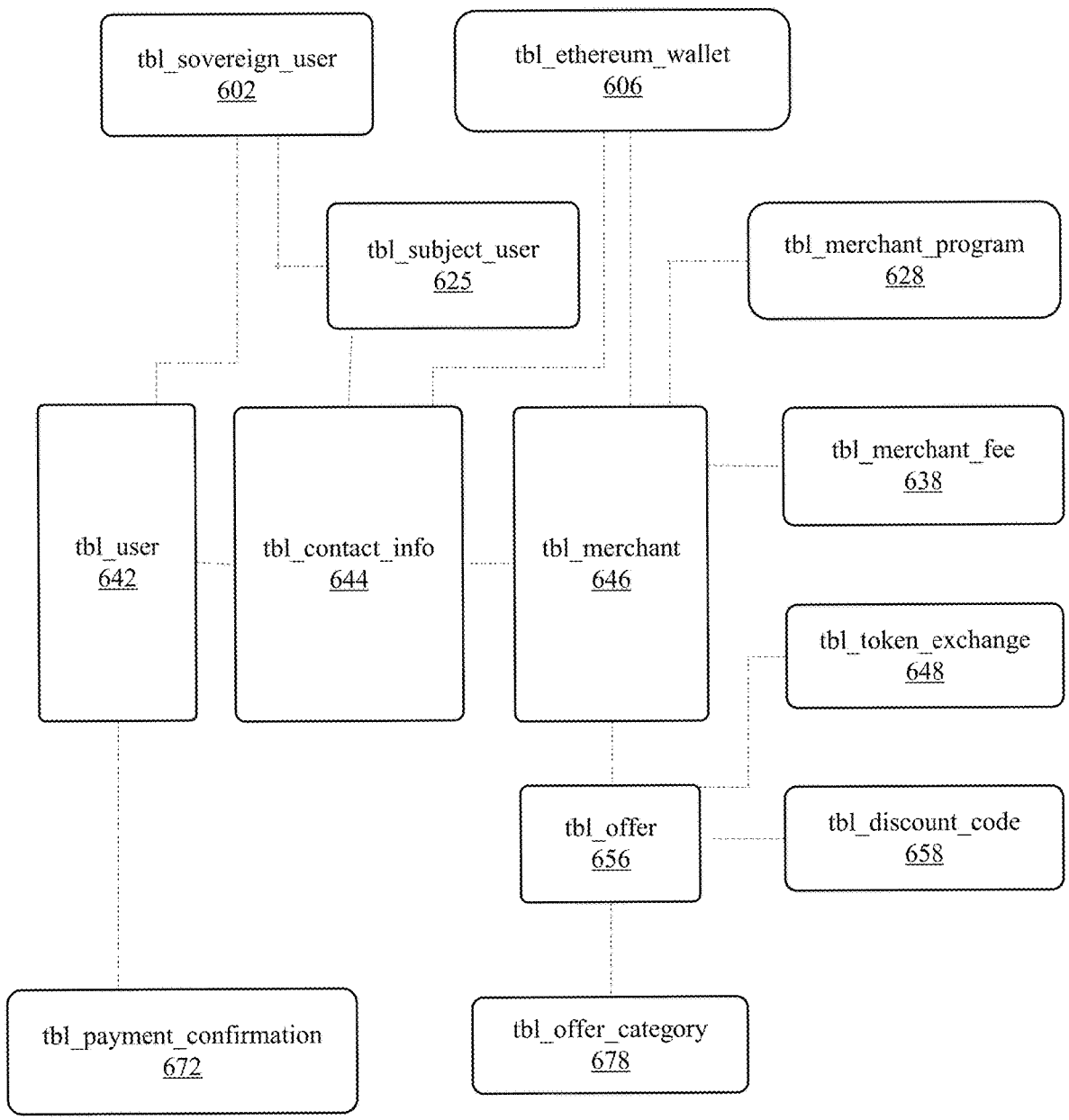
FIG. 5 constitutes a relationship diagram for data structures maintained in support of the distributed gaming system for administering transactions for a gambling casino including selling chips and redeeming chips using a private database, as described herein.

FIG. 5 constitutes a relationship diagram for an example set of data structures in a private database maintained in support of the distributed gaming system for administering transactions for a gambling casino including selling chips and redeeming chips using a private database, as described herein. The diagram shown in FIG. 5 illustrates one implementation of data structures maintained by a server application in support of the distributed gaming system described herein. Customer accounts and supervisor accounts are maintained in this structure using a sovereign table which is linked to one or more subject tables. According to this organization of the data structures, each sovereign user of the system is identified by a user table tbl_sovereign_user 602. The sovereign user is a customer or a pit boss, as described herein. In another example, the sovereign user can be a floor supervisor in the gambling system. Each customer, pit boss and any other user of the gambling system who buys tokens, such as a sponsor of the gaming system, has an account in the system that is identified in user table tbl_user 642. Detailed information for customers, pit bosses, floor managers and sponsor is stored in tbl_contact_info 644. In this example, authorization to act as a supervisor can be shared with a floor supervisor, which is in turn links to a customer account via user table tbl_user 642. A dealer is a subject user of the system, so is associated with table tbl_subject_user 625. Detailed information for dealers is also stored in tbl_contact_info 644. For the system described herein, the back of house administrative app accesses a data structure labeled merchant using tbl_merchant 646, as well as tbl_merchant_program 628 that holds the name and description data for the merchant. Tbl_offer 656 holds data fields with the merchant id, name, description and details of an offer, such as the start and end date, and a notification threshold related to the number of times the offer has been utilized. Tbl_merchant_fee 638 holds fields with a merchant id and fees bases on the number of transactions, with date fields. Tbl_token_exchange 648 holds fields that identify for a user id, and offer id and discount code associated with an offer listed in tbl_offer 656. The Tbl_token_exchange 648 e relationship diagram illustrated in FIG. 5 also includes blockchain table. Tbl_discount_code 658 can map token exchanges to discount codes usable on merchant systems. Tbl_offer_category 678 can map offers in the Tbl_offer 656 to categories to offers for management purposes. Tbl_payment_confirmation 672 manages confirmations of payments made by users represented in Tbl_user 642. Customers can spend tokens in the marketplace by utilizing a discount code they receive from the system or a particular merchant, and then utilizing the online ecommerce system of the merchant to make purchases. A merchant wallet can receive tokens sent from a customer wallet when a merchant offer is redeemed from the marketplace. Tokens in the intermediary account, in this example a merchant wallet, can be exchanged for fiat currency via the procedure that accepts token-to-fiat exchange messages from the merchant's identified intermediary account indicating confirmation of delivery of fiat currency to a customer having an identified user account, and in response transfers tokens from the customer wallet of the identified user account to the redemption wallet to extinguish, and records the token-to-fiat exchange in the private database and on the distributed ledger.

FIG. 6A through FIG. 6D illustrate the field entries for a representative subset of data structures that are utilized relative to customer apps and wallets, and pit boss apps and wallets, related as shown in FIG. 5 earlier. The database tables utilize primary keys (PK) and foreign keys (FK). FIG. 6A shows a representative set of fields for user table tbl_user 642 with primary key 'user_id' which links the user to the record with contact_info_id 702. FIG. 6B illustrates a representative organization of data fields for additional information about the user in tbl_contact_info 644 for a user with contact_info_id 706. FIG. 6C illustrates a representative organization for an Ethereum data structure tbl_ethereum_wallet 606 for a user with user_id 752. FIG. 6D illustrates a representative organization for tbl_merchant_program 628 including a merchant_program_id 776.

Figure 7A:
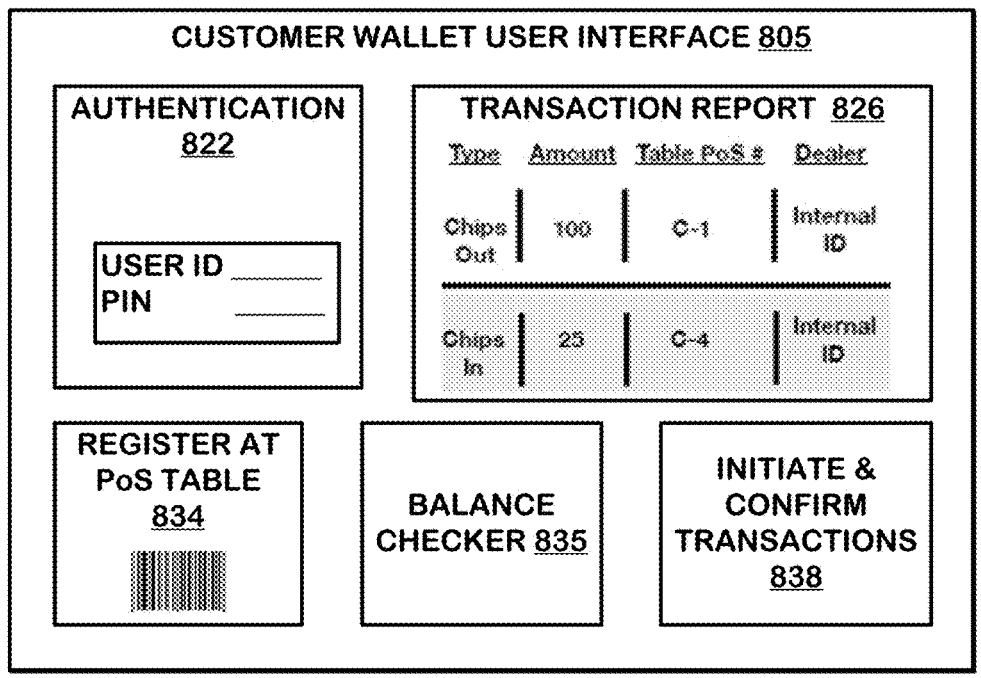
FIG. 7A shows a representative customer wallet user interface.

FIG. 7A shows a representative customer wallet user interface 805, that includes authentication 822 with a user ID and PIN. Additionally, register at PoS table 834 can include a bar code that the customer can use when they approach a gambling table, to register. In another implementation, near field communication can be used to identify the customer as a background action. Transaction report 826 lists transactions completed by the user. In one example, the reporting can show the type of transaction, the amount of the transaction, the table identifier for the transaction and the dealer ID. In another report date and time data can also be displayed in addition to other data. Balance checker 835 enable the user to readily check their token balance. Initiate and confirm transactions 838 enables the customer to enter a transaction request, such as a request for tokens, a request to redeem tokens for chips, and an acceptance of chips—typically from a dealer.

Figure 7B:
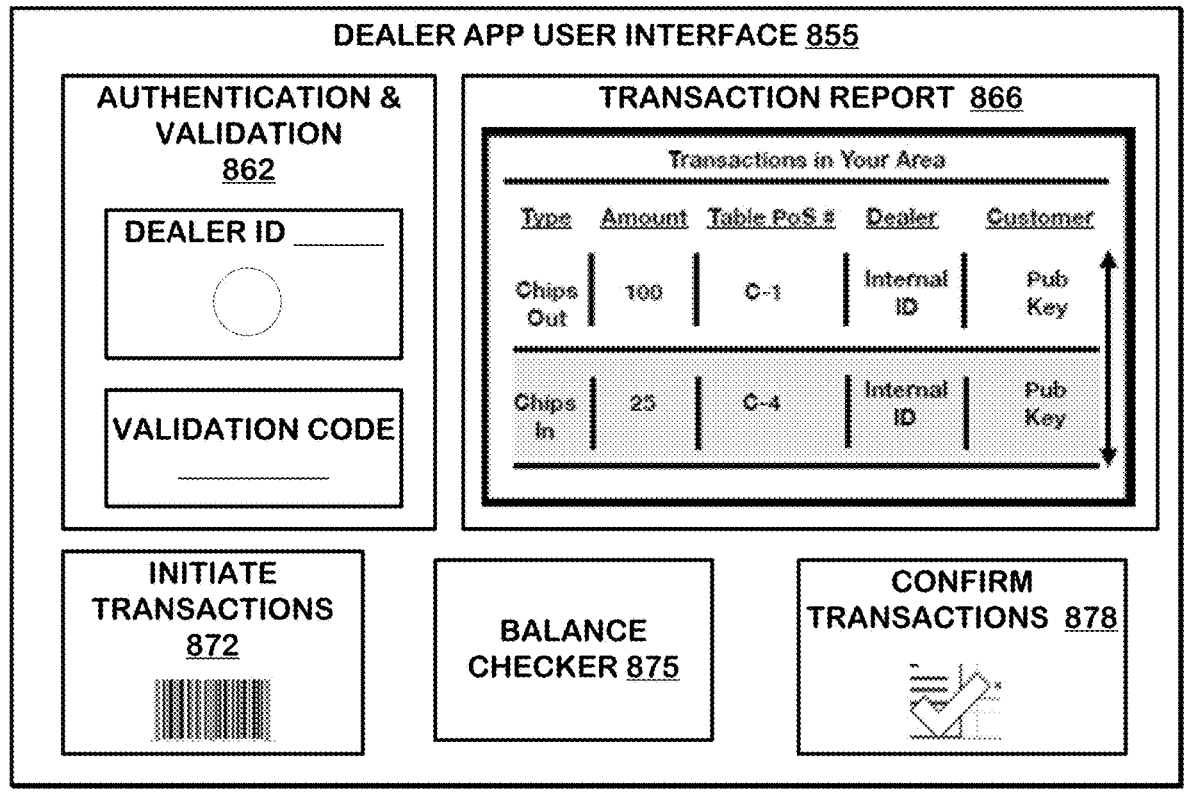
FIG. 7B shows a representative dealer wallet user interface.

FIG. 7B shows a representative dealer wallet user interface 855, that includes authentication and validation 862 with a dealer ID and a validation code, typically obtained from a supervisor, as described earlier. Additionally, dealer wallet user interface 855 includes transaction report 866 for monitoring activities by customers. In one example report, customer transactions are identified using the customer's public key. Dealer wallet user interface 855 also includes initiate transactions 872 which can utilize a barcode to identify the dealer making the transaction, and balance checker 875 that the dealer can use to track the chips and tokens at their PoS table. Also, confirm transactions 878 enables the dealer to confirm the completion of transactions, such as accepting token-to-chip exchange messages from the identified dealer intermediary account indicating confirmation of exchange of tokens for delivery of chips attributed to the user account for a particular customer, and in response to transfer tokens on the distributed ledger to the redemption wallet to extinguish the tokens, and record the token-to-chip exchange in the private database.

Figure 8A:
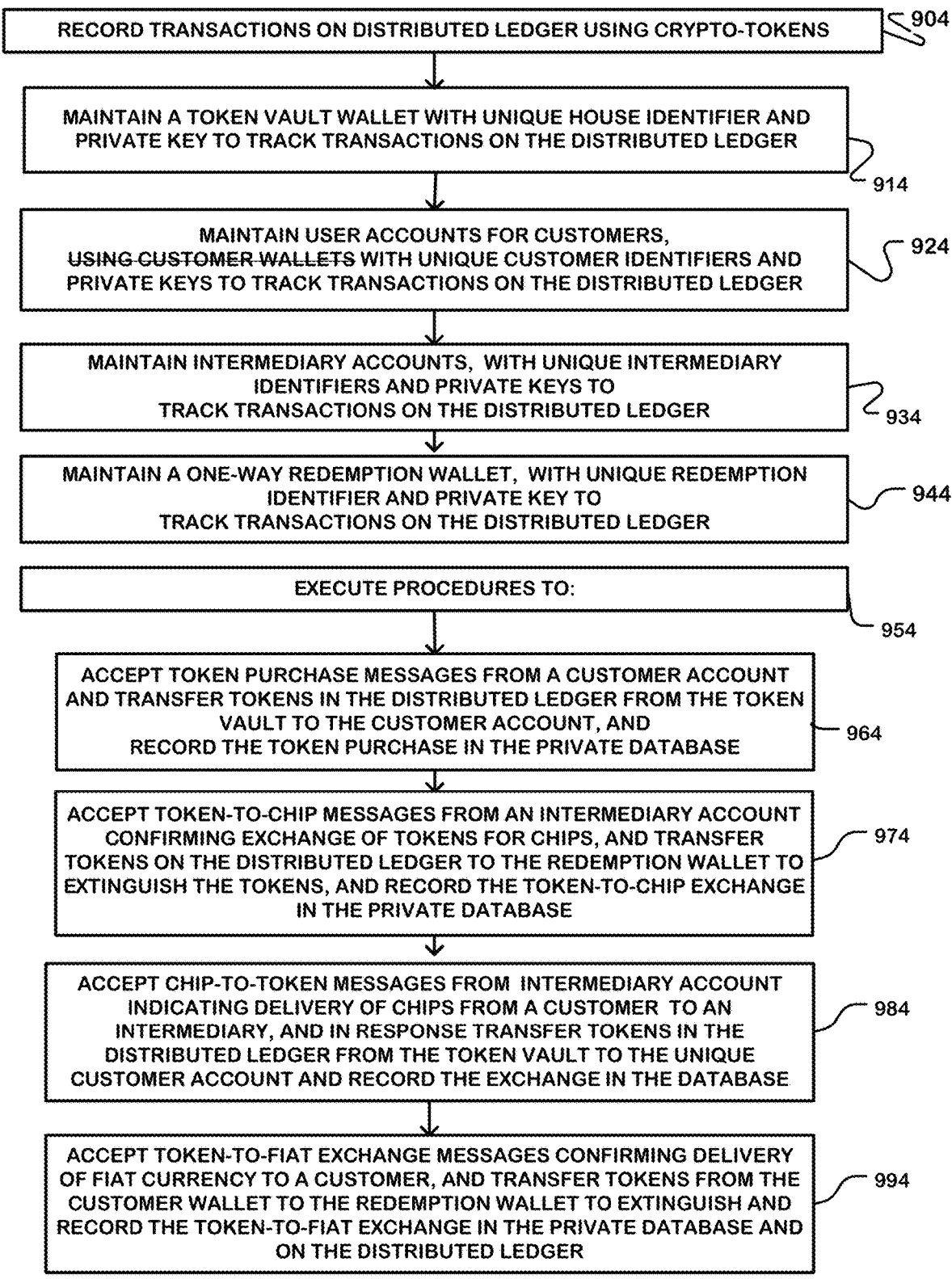
FIG. 8A illustrates the overview of a procedure for administering transactions for a gambling casino in a distributed gaming system.
Figure 8B:
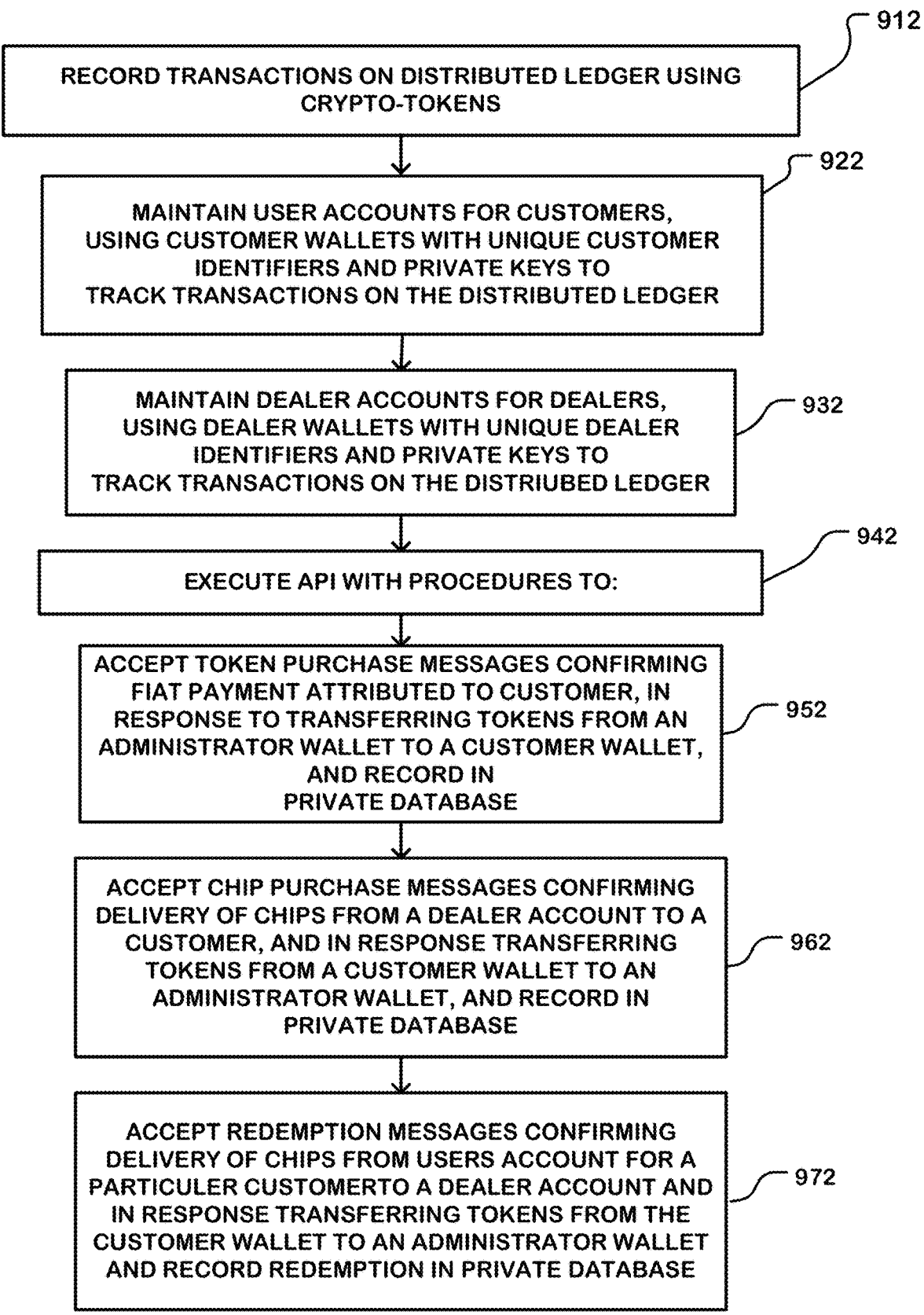
FIG. 8B illustrates the flowchart of details of a procedure for administering transactions for a gambling casino in a distributed gaming system, including selling chips and redeeming chips using a private database, with the support of the server and the administrator application.
Figure 9:
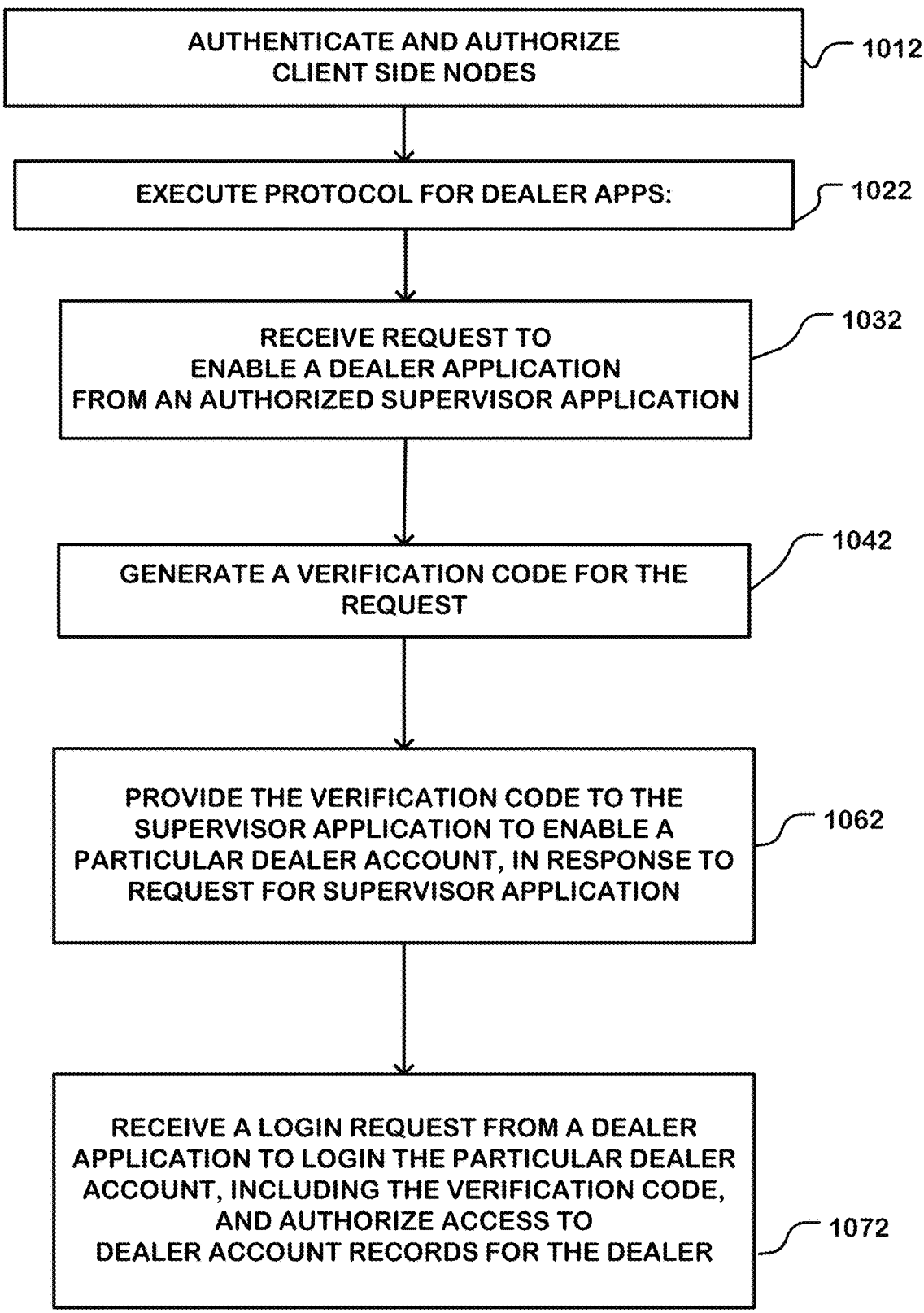
FIG. 9 illustrates the flowchart for enabling supervisor apps administering transactions for a gambling casino to authenticate and authorize client-side nodes

FIGS. 8A, 8B and 9 are simplified flowcharts of a procedure for administering transactions for a gambling casino in a distributed gaming system, including selling chips and redeeming chips using a private database and a distributed ledger, with the support of the server node or nodes and the administrator application. In this example, FIG. 8A illustrates the overview. The server-side application records transactions on the distributed ledger using crypto-tokens (904), recording at least some of the transactions. The application maintains a token vault wallet having a unique house identifier and private key to track transactions on the distributed ledger that include the unique house identifier (914). The token vault wallet stores the generated tokens when the system is initialized for the casino tokens on the blockchain network. The server-side node or nodes maintain user accounts for customers of the gaming casino, with customer wallets having unique customer identifiers and private keys to track transactions on the distributed ledger that include the unique customer identifiers (924). The server-side node or nodes also maintain intermediary accounts that include unique intermediary identifiers and private keys to track transactions on the distributed ledger that include the unique intermediary identifiers (934). The server-side node or nodes additionally maintain a one-way redemption wallet including a unique redemption identifier and private key to track transactions on the distributed ledger that include the unique redemption identifier (944). The server-side node or nodes communicate with client-side nodes in a communication network to execute distributed gaming system procedures (954). One procedure accepts token purchase messages from or on behalf of an identified customer account indicating confirmation of fiat payment by the identified customer account for tokens, and in response transfer tokens in the distributed ledger from the token vault to the unique customer identifier of the identified customer account, and record the token purchase in the private database. Another procedure accepts token-to-chip exchange messages from an identified intermediary account indicating confirmation of exchange of tokens for chips, and in response transfers tokens on the distributed ledger to the redemption wallet to extinguish the tokens, and records the token-to-chip exchange in the private database (974). A third procedure accepts chip-to-token exchange messages from an identified intermediary account indicating confirmation of delivery of chips from a customer having an identified customer account to an intermediary having the identified intermediary account, and in response transfers tokens in the distributed ledger from the token vault to the customer wallet with the unique customer identifier of the identified customer account, and records the chip-to-token exchange in the private database (984). A fourth procedure accepts token-to-fiat exchange messages from an identified intermediary account indicating confirmation of delivery of fiat currency to a customer having an identified user account, and in response transfers tokens from the customer wallet of the identified user account to the redemption wallet to extinguish, and records the token-to-fiat exchange in the private database and on the distributed ledger (994).

FIGS. 8B and 9 are simplified flowcharts that include a dealer application for a dealer wallet as an intermediary account in a procedure for administering transactions for a gambling casino in a distributed gaming system, including selling chips and redeeming chips using a private database and a distributed ledger, with the support of the server and the administrator application. In this example, the server-side application records transactions on the distributed ledger using crypto-tokens (912), recording at least some of the transactions. The application includes one or more administrator wallets, each of which has a unique house identifier and private key to track transactions on the distributed ledger with unique house identifier. The server-side application maintains user accounts for customers of the gaming casino, with customer wallets having unique customer identifiers and private keys to track transactions on the distributed ledger that include the unique customer identifiers (922). The server-side application also maintains intermediary accounts that include unique intermediary identifiers and private keys to track transactions on the distributed ledger that include the unique intermediary identifiers. Dealer accounts for dealers are intermediary accounts having unique dealer identifiers and private keys to track transactions on the distributed ledger that include the unique dealer identifiers (932). The server-side application executes an API (942) with distributed gaming system procedures. One procedure is accepting token purchase messages indicating confirmation of fiat payment attributed to the user account (952) for a particular customer and in response transferring tokens from an administrator wallet to a customer wallet. Another procedure is accepting chip purchase messages indicating confirmation of delivery of chips from a dealer account to a customer (962) and in response transferring tokens from the customer wallet of the identified user account to one of the one or more administrator wallets, and recording the purchase of chips in the private database. A third procedure is accepting redemption messages indicating confirmation of delivery of chips attributed to the user account for a particular customer to a dealer account (972) and in response transferring tokens from the customer wallet of the identified user account to one of the one or more administrator wallets and recording the redemption of chips in the private database.

FIG. 9 illustrates a flowchart for enabling supervisor apps administering transactions for a gambling casino to authenticate and authorize client-side nodes (1012). The protocol for dealer applications (1022) for authentication and authorization of dealer applications on client-side nodes includes receiving from an authorized supervisor application a request to enable a dealer application (1032) and generating a verification code for the request (1042). The protocol includes providing the verification code to the supervisor application in response to the request from the supervisor application to enable a particular dealer account (1062) with the verification code available to be provided to a dealer. The protocol further includes receiving a login request from a dealer application to login the particular dealer account including the verification code, and in response authorizing access to dealer account records for the particular dealer account by the dealer application (1072). The generated verification code comprises a one-time code and further comprises a time limit during which the verification code can be utilized, in some implementations.

Flowcharts illustrating procedures for administering transactions for a gambling casino in a distributed gaming system are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM Info-Sphere™, Borealis™, and Yahoo! S4™.

Figure 10:
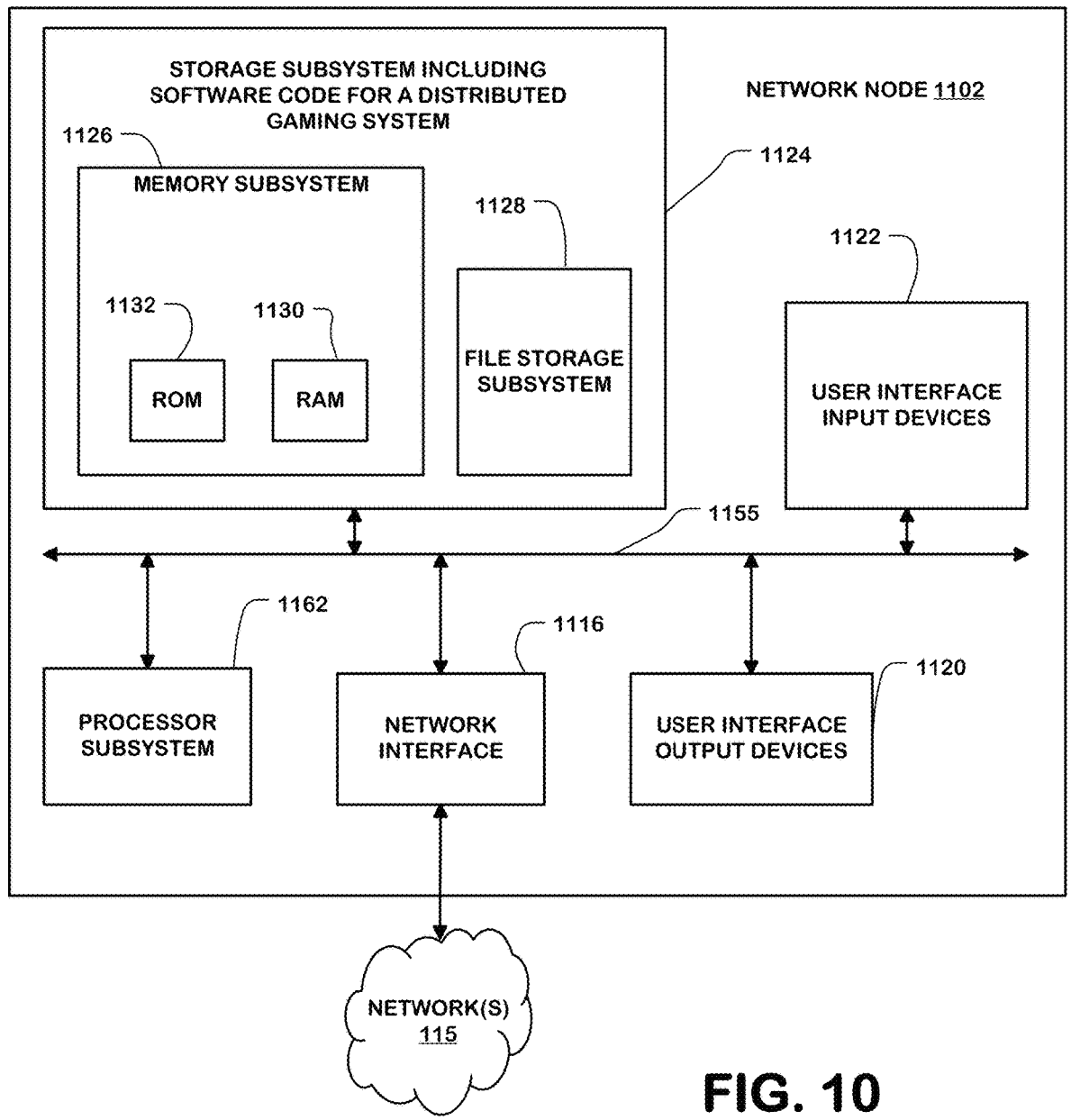
FIG. 10 is a simplified diagram of a hardware platform which is configured for a distributed gaming system for administering transactions for a gambling casino including selling chips and redeeming chips using a private database, as described herein.

FIG. 10 is a simplified block diagram of a network node that can be used to implement management system 104, dealer monitor system 108, customer app 102, dealer app 103 and other components of the electronic system for administering transactions for a gambling casino in a distributed gaming system, described herein. The network node typically includes an operating system executed by a processor subsystem 1162 which communicates with a number of peripheral devices via bus subsystem 1155. These peripheral devices may include a storage subsystem 1124, comprising a memory subsystem 1126 and a file storage subsystem 1128, user interface input devices 1122, user interface output devices 1120, and a network interface subsystem 1116. The input and output devices allow user interaction with network node 1102. Network interface subsystem 1116 provides an interface to outside network 115 and is coupled via network 115 to other elements in a data processing system. The physical hardware components of network interfaces are sometimes referred to as network interface cards (NICs), although they need not be in the form of cards; for instance they could be in the form of integrated circuits (ICs) and connectors fitted directly onto a motherboard, or in the form of macro cells fabricated on a single integrated circuit chip with other components of the computer system.

User interface input devices 1122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into network node 1102 or onto network 115.

User interface output devices 1120 may include a display subsystem, a printer, a fax machine, or nonvisual displays such as audio output devices. The display subsystem may include a cathode ray tube (CRT), a flat panel device such as a liquid crystal display (LCD), a projection device, or some other mechanism for creating a visible image. The display subsystem may also provide a nonvisual display such as via audio output devices. In general, use of the term "output device" is intended to include all possible types of devices and ways to output information from network node to the user or to another machine or network node. In particular, an output device of the network node on which the e-book engagement system is implemented, may include a visual output informing a user of action recommendations made by the system, or may include a communication device for communicating action signals.

Storage subsystem 1124 stores the basic programming and data constructs that provide the functionality of certain embodiments of the present invention. For example, the various modules implementing the functionality of certain embodiments of the invention may be stored in storage subsystem 1124. These software modules are generally executed by processor subsystem 1162.

Memory subsystem 1126 typically includes a number of memories including a main random access memory (RAM) 1130 for storage of instructions and data during program execution and a read-only memory (ROM) 1132 in which fixed instructions are stored. File storage subsystem 1128 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer-readable medium such as one or more CD-ROMs, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed. The databases and modules implementing the functionality of certain embodiments of the invention may also be stored by file storage subsystem 1128. The host memory subsystem 1126 contains, among other things, computer instructions which, when executed by the processor subsystem 1162, cause the computer system to operate or perform functions as described herein. As used herein, processes and software that are said to run in or on "the host," "the computer" or "the network," execute on the processor subsystem 1162 in response to computer instructions and data in the host memory subsystem 1126 including any other local or remote storage for such instructions and data.

Bus subsystem 1155 provides a mechanism for letting the various components and subsystems of network node 1102 communicate with each other as intended. Although bus subsystem 1155 is shown schematically as a single bus, alternative embodiments of the bus subsystem may use multiple busses.

A network node can be of varying types including a personal computer, a portable computer, smart phone, tablet computer, a workstation, a computer terminal, a network computer, a television, a mainframe, a server farm, a widely distributed set of loosely networked computers, or any other data processing system or user device. Due to the ever-changing nature of computers and networks, the description of network node depicted in FIG. 11 is intended only as a specific example for purposes of illustrating the preferred embodiments of the present invention. Many other configurations of network node are possible having more or less components than the system depicted in FIG. 11.

In some embodiments, in addition, one or more of the server application, the supervisor application, and the reader application can be implemented in the network node as a Software-as-a-Service (SaaS) application, a web-architected application or a cloud-delivered service. Examples of common SaaS applications today include Salesforce.com™, Box™ Dropbox™, Google Apps™, Amazon Web Services AWS™, Microsoft Office 365™, Workday™, Oracle on Demand™, Taleo™, Yammer™, and Concur™. SaaS applications provide functionalities to users that are implemented in the cloud, and that are the target of policies, e.g., logging in, editing user information, updating whitelists, deleting contacts from the contact list, in contrast to the offerings of simple websites and e-commerce sites. Note that a SaaS application can be supported by both web browser clients and application clients that use URL-based APIs (application programming interfaces).

Disclosed technology for managing transactions between a customer and a gaming house without using cash utilizes blockchain transactions enabling a management application to facilitate purchase of digital tokens by the customer using a credit card or cash and providing the digital tokens via blockchain transaction. Also included is receiving a request from the customer, at a PoS table, for chips in exchange for tokens and exchanging the tokens for chips using a blockchain transaction. Further disclosed is exchanging a quantity of physical chips for digital tokens and exchanging the digital tokens for fiat currency via a blockchain transaction.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The system delivers tokens to customers using a blockchain transfer from trust assurance network blockchain account. The system includes procedures to deliver tokens to customers, using a blockchain transaction. The system also includes procedures to use a blockchain transaction to exchange tokens for chips, and to extinguish tokens exchanged for the chips. The system further includes procedures to transfer tokens to the house blockchain account using a blockchain transaction, such as for chips "lost" by a customer in a game.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims. What is claimed is:

The invention claimed is:

1. A distributed gaming system, comprising:
a server-side node or nodes, including one or more data processors, having access to a private database and a distributed ledger, the server-side node or nodes configured to:
maintain a crypto-token vault wallet having a unique house identifier and private key to track transactions on the distributed ledger that include the unique house identifier;
maintain user accounts for customers, including unique customer identifiers and private keys to track transactions on the distributed ledger that include the unique customer identifiers;
maintain intermediary accounts, including unique intermediary identifiers and private keys to track transactions on the distributed ledger that include the unique intermediary identifiers;
maintain a one-way redemption wallet having a unique redemption identifier and private key to track transactions on the distributed ledger that include the unique redemption identifier; and
communicate with client-side nodes in a communication network to execute procedures:
to accept crypto-token purchase messages from an identified customer account indicating confirmation of fiat payment by the identified customer account for crypto-tokens, and in response transfer crypto-tokens in the distributed ledger from the crypto-token vault wallet to the unique customer identifier of the identified customer account, and record the crypto-token purchase in the private database;
to accept crypto-token-to-chip exchange messages from an identified intermediary account indicating confirmation of exchange of crypto-tokens for chips, and in response transfer crypto-tokens on the distributed ledger to the redemption wallet to extinguish the crypto-tokens, and record the crypto-token-to-chip exchange in the private database;
to accept chip-to-crypto-token exchange messages from an identified intermediary account indicating confirmation of delivery of chips from a customer having an identified customer account to an intermediary having the identified intermediary account, and in response transfer crypto-tokens in the distributed ledger from the crypto-token vault wallet to the unique customer identifier of the identified customer account, and record the chip-to-crypto-token exchange in the private database; and
to accept crypto-token-to-fiat exchange messages from an identified intermediary account indicating confirmation of delivery of fiat currency to a customer having an identified user account, and in response transfer tokens from the identified user account to the redemption wallet to extinguish, and record the crypto-token-to-fiat exchange in the private database and on the distributed ledger.

2. The system of claim 1, the server-side node or nodes being configured to create a tranche of crypto-tokens in the crypto-token vault wallet.

3. The system of claim 1, the server-side node or nodes being configured to assign crypto-tokens to the crypto-token vault wallet in response to a message confirming receipt of value.

4. The system of claim 1, wherein the data processor or data processors of the server-side node or nodes include logic for authentication and authorization of intermediary account holders and customer account holders at client-side nodes, including a first protocol for customer account holders on client-side nodes on the communication network, and a second protocol for intermediary account holders on client-side nodes on the communication network.

5. The system of claim 4, wherein the second protocol for intermediary account holders includes
receiving from an authorized supervisor application a request to enable a dealer application;
generating a verification code for the request;
providing the verification code to the supervisor application in response to the request from the supervisor application to enable a particular intermediary account holder, the verification code being provided to a dealer outside the communication network; and
receiving a login request via the communication network from a dealer application to login the particular intermediary account holder by the dealer application using the verification code.

6. The system of claim 5, wherein generating a verification code further comprises generating a one-time code.

7. The system of claim 6, wherein the verification code further comprises a time limit during which the verification code can be utilized.

8. The system of claim 1, wherein the distributed ledger comprises a block chain.

9. The system of claim 1, wherein the server-side node or nodes is configured to maintain a dealer wallet for intermediary accounts to track transaction on the distributed ledger for the corresponding intermediary account.

10. The system of claim 1, wherein the server-side node or nodes is configured to maintain a customer wallet for customer accounts to track transaction on the distributed ledger for the corresponding customer account.

11. A non-transitory computer readable memory storing computer instructions for administering transactions for a gambling casino in a distributed gaming system, including selling chips and redeeming chips using a private database and a distributed ledger, comprising computer instructions to:
   maintain a crypto-token vault wallet having a unique house identifier and private key to track transactions on the distributed ledger that include the unique house identifier;
   maintain user accounts for customers, including unique customer identifiers and private keys to track transactions on the distributed ledger that include the unique customer identifiers;
   maintain intermediary accounts, including unique intermediary identifiers and private keys to track transactions on the distributed ledger that include the unique intermediary identifiers;
   maintain a one-way redemption wallet having a unique redemption identifier and private key to track transactions on the distributed ledger that include the unique redemption identifier; and
   communicate with client-side nodes in a communication network to execute procedures:
      to accept crypto-token purchase messages from an identified customer account indicating confirmation of fiat payment by the identified customer account for crypto-tokens, and in response transfer tokens in the distributed ledger from the crypto-token vault wallet to the unique customer identifier of the identified customer account, and record the crypto-token purchase in the private database;
      to accept crypto-token-to-chip exchange messages from an identified intermediary account indicating confirmation of exchange crypto-tokens for chips, and in response transfer crypto-tokens on the distributed ledger to the redemption wallet to extinguish the crypto-tokens, and record the crypto-token-to-chip exchange in the private database;
      to accept chip-to-crypto-token exchange messages from an identified intermediary account indicating confirmation of delivery of chips from a customer having an identified customer account to an intermediary having the identified intermediary account, and in response transfer crypto-tokens in the distributed ledger from the crypto-token vault wallet to the unique customer identifier of the identified customer account, and record the chip-to-crypto-token exchange in the private database; and
      to accept crypto-token-to-fiat exchange messages from an identified intermediary account indicating confirmation of delivery of fiat currency to a customer having an identified user account, and in response transfer crypto-tokens from the identified user account to the redemption wallet to extinguish, and record the crypto-token-to-fiat exchange in the private database and on the distributed ledger.

12. The non-transitory computer readable memory storing computer instructions of claim 11, including computer instructions for authentication and authorization of intermediary account holders and customer account holders at client-side nodes, including a first protocol for customer account holders on client-side nodes on the communication network, and a second protocol for intermediary account holders on client-side nodes on the communication network.

13. The non-transitory computer readable memory storing computer instructions of claim 12, wherein the second protocol for intermediary account holders includes
   receiving from an authorized supervisor application a request to enable a dealer application;
   generating a verification code for the request;
   providing the verification code to the supervisor application in response to the request from the supervisor application to enable a particular intermediary account holder, the verification code being provided to a dealer outside the communication network; and
   receiving a login request via the communication network from a dealer application to login the particular intermediary account holder by the dealer application using the verification code.

14. The non-transitory computer readable memory storing computer instructions of claim 13, wherein generating a verification code further comprises generating a one-time code.

15. The non-transitory computer readable memory storing computer instructions of claim 14, wherein the verification code further comprises a time limit during which the verification code can be utilized.

16. The non-transitory computer readable memory storing computer instructions of claim 11, wherein the distributed ledger comprises a block chain.

17. The non-transitory computer readable memory storing computer instructions of claim 11, including computer instructions to maintain a dealer wallet for intermediary accounts to track transaction on the distributed ledger for the corresponding intermediary account.

18. The non-transitory computer readable memory storing computer instructions of claim 11, including computer instructions to maintain a customer wallet for customer accounts to track transaction on the distributed ledger for the corresponding customer account.

19. A method of administering transactions for a gambling casino in a distributed gaming system, including selling chips and redeeming chips using a private database and a distributed ledger, comprising:
   maintaining a crypto-token vault wallet having a unique house identifier and private key to track transactions on the distributed ledger that include the unique house identifier;
   maintaining user accounts for customers, including unique customer identifiers and private keys to track transactions on the distributed ledger that include the unique customer identifiers;
   maintaining intermediary accounts, including unique intermediary identifiers and private keys to track transactions on the distributed ledger that include the unique intermediary identifiers;
   maintaining a one-way redemption wallet having a unique redemption identifier and private key to track transactions on the distributed ledger that include the unique redemption identifier; and
   communicating with client-side nodes in a communication network to execute procedures:
      to accept crypto-token purchase messages from an identified customer account indicating confirmation of fiat payment by the identified customer account for crypto-tokens, and in response transfer crypto-tokens in the distributed ledger from the crypto-token vault wallet to the unique customer identifier of the identified customer account, and record the crypto-token purchase in the private database;

to accept crypto-token-to-chip exchange messages from an identified intermediary account indicating confirmation of exchange crypto-tokens for chips, and in response transfer crypto-tokens on the distributed ledger to the redemption wallet to extinguish the crypto-tokens, and record the crypto-token-to-chip exchange in the private database;

to accept chip-to-crypto-token exchange messages from an identified intermediary account indicating confirmation of delivery of chips from a customer having an identified customer account to an intermediary having the identified intermediary account, and in response transfer crypto-tokens in the distributed ledger from the crypto-token vault wallet to the unique customer identifier of the identified customer account, and record the chip-to-crypto-token exchange in the private database; and to accept crypto-token-to-fiat exchange messages from an identified intermediary account indicating confirmation of delivery of fiat currency to a customer having an identified user account, and in response transfer crypto-tokens from the identified user account to the redemption wallet to extinguish, and record the crypto-token-to-fiat exchange in the private database and on the distributed ledger.

20. The method of claim 19, including assigning crypto-tokens to the crypto-token vault wallet in response to a message confirming receipt of value.

21. The method of claim 19, including executing procedures for authentication and authorization of intermediary account holders and customer account holders at client-side nodes, including a first protocol for customer account holders on client-side nodes on the communication network, and a second protocol for intermediary account holders on client-side nodes on the communication network.

22. The method of claim 21, wherein the second protocol for intermediary account holders includes
    receiving from an authorized supervisor application a request to enable a dealer application;
    generating a verification code for the request;
    providing the verification code to the supervisor application in response to the request from the supervisor application to enable a particular intermediary account holder, the verification code being provided to a dealer outside the communication network; and
    receiving a login request via the communication network from a dealer application to login the particular intermediary account holder by the dealer application using the verification code.

23. The method of claim 22, wherein generating a verification code further comprises generating a one-time code.

24. The method of claim 23, wherein the verification code further comprises a time limit during which the verification code can be utilized.

25. The method of claim 19, wherein the distributed ledger comprises a block chain.

26. The method of claim 19, including maintaining a dealer wallet for intermediary accounts to track transaction on the distributed ledger for the corresponding intermediary account.

27. The method of claim 19, including maintaining a customer wallet for customer accounts to track transaction on the distributed ledger for the corresponding customer account.

\* \* \* \* \*